United States Patent
Hayashi

(10) Patent No.: US 7,497,143 B2
(45) Date of Patent: Mar. 3, 2009

(54) AUTOMOTIVE PEDAL SUPPORT STRUCTURE

(75) Inventor: Kouji Hayashi, Hiroshima (JP)

(73) Assignee: Mazda Motor Corporation (JP)

( * ) Notice: Subject to any disclaimer, the term of this patent is extended or adjusted under 35 U.S.C. 154(b) by 650 days.

(21) Appl. No.: 10/879,362

(22) Filed: Jun. 30, 2004

(65) Prior Publication Data

US 2005/0044982 A1 Mar. 3, 2005

(30) Foreign Application Priority Data

| Sep. 3, 2003 | (JP) | ............................. 2003-311255 |
| Sep. 3, 2003 | (JP) | ............................. 2003-311267 |
| Sep. 3, 2003 | (JP) | ............................. 2003-311279 |

(51) Int. Cl.
*G05G 1/30* (2008.04)
*B60T 7/12* (2006.01)
*B60T 7/22* (2006.01)
*B60K 28/10* (2006.01)

(52) U.S. Cl. ............................. 74/512; 74/560; 180/274

(58) Field of Classification Search ........... 74/512–514, 74/560; 180/274; 60/554
See application file for complete search history.

(56) References Cited

U.S. PATENT DOCUMENTS

| 6,041,674 A | 3/2000 | Kato |
| 6,339,971 B1 | 1/2002 | Kato |
| 6,655,489 B2 * | 12/2003 | Kawai et al. ................. 180/274 |
| 6,742,411 B2 * | 6/2004 | Aoki et al. .................... 74/512 |
| 7,111,703 B2 * | 9/2006 | Endo et al. ................... 180/274 |
| 7,275,614 B2 * | 10/2007 | Hayashi ...................... 180/274 |
| 2002/0043125 A1 * | 4/2002 | Oono et al. ................... 74/512 |
| 2002/0078784 A1 | 6/2002 | Hayashihara |
| 2006/0070487 A1 * | 4/2006 | Hayashi ........................ 74/560 |

FOREIGN PATENT DOCUMENTS

| EP | 0-256-466 A2 | 2/1988 |
| FR | 2-739-947 A1 | 4/1997 |
| JP | 09-254821 | 9/1997 |
| JP | 10-338108 | 12/1998 |

OTHER PUBLICATIONS

European Search Report dated Dec. 15, 2004 for Application No. EP-04-01-4715.

* cited by examiner

*Primary Examiner*—Vinh T. Luong
(74) *Attorney, Agent, or Firm*—Studebaker & Brackett PC; Donald R. Studebaker

(57) ABSTRACT

First and second guide members 53 and 54 are fixed to a reinforcing member 9, while a pedal bracket 17 is provided with first and second abutment parts 41 and 42 for guiding the pedal bracket 17. When the pedal bracket 17 is moved backward due to automobile collision, the first abutment part 41 abuts against and slides along the first guide member 53, and then the second abutment part 42 abuts against and slides along the second guide member 54 after the first abutment part 41 has finished sliding along the first guide member 53. Thus, the position of the pedal bracket 17 is changed using both the guide members 53 and 54.

5 Claims, 21 Drawing Sheets

AUTOMOTIVE PEDAL SUPPORT STRUCTURE

BACKGROUND OF THE INVENTION (1) Field of the Invention

The present invention relates to operating pedal support structures disposed behind dashpanels of automobiles.

(2) Background Art

Generally, when an automobile collision (in particular, a forward collision) is about to occur, a driver brakes the automobile by stepping on a brake pedal in order to avoid this collision. Nevertheless, in many cases, the automobile does not stop and causes the collision with the driver stepping on the brake pedal.

In such a forward collision, a front body crushes while absorbing collision energy, and an engine disposed within an engine room moves backward while pushing a dashpanel that is located behind the engine to serve as a partition between the engine room and a cabin. In the front body, a brake master cylinder is provided in front of the dashpanel, and is connected via an operating rod to a brake pedal located behind the dashpanel. Thus, with the backward movement of the dashpanel (and the master cylinder), the brake pedal is also pushed and moved backward via the operating rod. As a result, a foot space for a driver becomes narrow, which brings about the situation where a steering column for supporting a steering wheel or other members are likely to interfere with a foot of the driver stepping on a pedal portion (i.e., a stepped-on portion) of the brake pedal.

Therefore, in order to reduce the impact that acts upon the foot of the driver, it is necessary to ensure a sufficient foot space when the dashpanel is deformed as described above. Specifically, if the movement of the pedal portion of the brake pedal toward the rear of the automobile body can be suppressed upon backward movement of the dashpanel, a large foot space can be maintained below a driver's seat irrespective of the deformation of the dashpanel.

In consideration of this, U.S. Pat. No. 6,339,971 discloses an automotive pedal support structure in which a pedal portion of an operating pedal such as a brake pedal is moved relatively toward the front of an automobile body when a dashpanel is deformed toward a cabin.

In this automotive pedal support structure, the operating pedal is supported to a pedal bracket fixed to the dashpanel such that the operating pedal can be swung forward and backward. And this automotive pedal support structure is provided with: a fastening mechanism for fastening the pedal bracket to the automobile body so that the pedal bracket can be detached toward the rear of the automobile body; and a guide mechanism for changing the position of the pedal bracket to cause the relative movement of the pedal portion of the operating pedal toward the front of the automobile body when the pedal bracket is moved relatively toward the rear of the automobile body.

This guide mechanism includes: a guide member fixed to a reinforcing member extended in a widthwise direction of the automobile body within an instrument panel; and an abutment member fixed to the pedal bracket. The abutment member is fastened to the guide member so as to be detachable backward, and is slidable on and in surface contact with a guide surface formed at the guide member. The guide surface is inclined to become lowered toward the rear of the automobile body.

Therefore, upon relative movement of the pedal bracket toward the rear of the automobile body caused by automobile collision, the abutment member of the pedal bracket starts sliding along the guide surface of the guide member. At the time when the abutment member has slid a predetermined distance, the fastening of the abutment member to the guide member, which is achieved by the fastening mechanism, is loosened. Then, the abutment member continues to slide along the guide surface, thus changing the position of the pedal bracket so as to cause the relative movement of the pedal portion of the operating pedal toward the front of the automobile body.

The front-side region of the guide surface is gently inclined so as to smoothly loosen the fastening of the abutment member to the guide member and so as not to increase a collision load applied to the reinforcing member, while the rear-side region of the guide surface is steeply inclined so as to greatly change the position of the pedal bracket.

However, the above-described pedal support structure requires a longitudinally elongated large-sized guide member whose guide surface varies in inclination. Nevertheless, a large number of interior trim articles such as meters and the like exist within an instrument panel that is provided with the guide member, and therefore, it is difficult to ensure a longitudinally enlarged installation space for the guide member.

SUMMARY OF THE INVENTION

In view of the above, an object of the present invention is to suppress the movement of a pedal portion of an operating pedal toward the rear of an automobile body by greatly changing the position of a pedal bracket without increasing a load applied to a reinforcing member for supporting a guide member, even if an entire guide mechanism is not longitudinally elongated.

Another object of the present invention is to provide a pedal support structure that can easily control how much and at what point in time the position of the pedal bracket is changed upon automobile collision, i.e., a pedal support structure that allows greater design freedom.

Still another object of the present invention is to ensure that the position of the pedal bracket changes by contriving the arrangement of the guide mechanism whereby a frictional resistance between an abutment part and a guide surface is reduced to smoothly slide the abutment part along the guide surface.

Specifically, an automotive pedal support structure according to the present invention includes:

a pedal bracket fixed to a dashpanel of an automobile;

an operating pedal supported to the pedal bracket so as to swing forward and backward;

a reinforcing member extended in a widthwise direction of an automobile body within an instrument panel; and a guide mechanism for changing the position of the pedal bracket to suppress a relative movement of a pedal portion of the operating pedal toward the rear of the automobile body when the pedal bracket is moved relatively toward the rear of the automobile body, wherein the guide mechanism includes: at least one guide surface that is supported to the reinforcing member, and is inclined obliquely downward to become gradually lowered toward the rear of the automobile body; and at least one abutment part that is provided at the pedal bracket to slide along the guide surface with the relative movement of the pedal bracket toward the rear of the automobile body, thereby changing the position of the pedal bracket, and wherein either or both of the guide surface and the abutment part are plural in number, and the plurality of the guide surfaces or abutment parts are separate from one another to independently abut against the counterpart or counterparts, thereby sequentially changing the position of the pedal bracket.

As described above, according to the present invention, at least the guide surface or the abutment part is provided in plurality to change the position of the pedal bracket more and more. Thus, even if the entire guide mechanism is not longitudinally elongated, a load applied to the reinforcing member upon automobile collision can be reduced, and the position of the pedal bracket can be greatly changed. Consequently, a large foot space can be ensured for a driver.

Furthermore, how much and at what point in time the position of the pedal bracket is changed when the pedal bracket is moved toward the rear of the automobile body can be appropriately determined by the arrangement of the plurality of abutment parts or guide surfaces to be provided. As a result, greater design freedom is allowed.

In one preferred embodiment, first and second guide surfaces are provided adjacent to the reinforcing member, the first guide surface is located toward the front of the automobile body while the second guide surface is located toward the rear of the automobile body, and with the relative movement of the pedal bracket toward the rear of the automobile body, the pedal bracket causes a positional change along the first guide surface and then a positional change along the second guide surface.

In this case, it is preferable that the first guide surface has a gentler inclination and the second guide surface has a steeper inclination. Thus, the position of the pedal bracket can be changed in steps, which is advantageous in avoiding the application of a large collision load on the reinforcing member. Besides, if the degree of inclination of both the guide surfaces is to be changed in this manner, it is not difficult to machine both the guide surfaces because these guide surfaces are not continuous.

It is preferable that: the first guide surface is formed at a first guide member fixed to the reinforcing member; and the second guide surface is formed at a second guide member formed separately from the first guide member and fixed to the reinforcing member.

If the first and second guide surfaces are formed at a single guide member, this guide member is deformed to change the position or shape of the second guide surface upon application of an excessive load when the abutment part abuts against the first guide surface. Thus, even if the fastening of the fastening mechanism is loosened, the abutment part might not abut against the second guide surface as planned, or the abutment part might not smoothly slide along the second guide surface. As measures to prevent such a problem, the enhancement of strength of the guide member may be taken into consideration; however, such measures increase the weight and cost of the guide member.

Therefore, in the present embodiment, both the guide surfaces are formed at separate guide members. Thus, even if the first guide member is broken, the influence of this breakage on the second guide member can be avoided, which is advantageous in certainly changing the position of the pedal bracket by using the second guide surface. In addition, since both the guide surfaces are formed at the separate guide members, both the guide surfaces can be easily formed.

It is preferable that:
the pedal support structure further includes a guide bracket fixed to the reinforcing member to extend downward therefrom;
the first guide surface is provided to transmit a load to a front face of the guide bracket when the position of the pedal bracket is changed; and
the second guide surface is provided to transmit a load to a lower face of the guide bracket when the position of the pedal bracket is changed.

The reinforcing member is extended in the widthwise direction of the automobile body within the instrument panel, and both ends of the reinforcing member are supported to the automobile body. Thus, if a large collision load is applied in a direction orthogonal to the reinforcing member, the reinforcing member is broken, and the positional change of the pedal bracket using the guide members cannot be achieved.

Therefore, in the present embodiment, the first guide surface is located so as to transmit a load to the front face of the guide bracket extended downward from the reinforcing member. Thus, even if a large load is applied to the first guide surface in an initial state in which the pedal bracket has started moving toward the rear of the automobile body, this load does not serve as a bending force against the reinforcing member but serves as a torsional force against the reinforcing member via the guide bracket, and as a result the breakage of the reinforcing member is prevented.

Besides, not only a force for moving the pedal bracket toward the rear of the automobile body but also a force for pushing up the pedal bracket from below might be exerted upon automobile collision. When the abutment part located at the pedal bracket has abutted against the second guide surface, the reinforcing member receives the pushing-up force via the second guide surface and the guide bracket. Thus, the abutment part abuts against the second guide surface while moving backward, and therefore, the abutment part slides along this guide surface without causing a high resistance. Consequently, this sliding forces the pedal bracket to change its position, and suppresses the movement of the pedal portion of the operating pedal toward the rear of the automobile body.

Furthermore, it is preferable that the abutment part includes a single abutment part, and the single abutment part abuts against and slides along the second guide surface after having finished sliding along the first guide surface.

Thus, after having finished sliding along the first guide surface, the abutment part abuts against the second guide surface while maintaining its state of motion. Therefore, a frictional resistance in the initial sliding of the abutment part along the second guide surface becomes low, the abutment part can be smoothly slid, and it is possible to reduce a load applied to the guide surfaces and the reinforcing member when the position of the pedal bracket is changed.

In another embodiment, it is preferable that:
the first guide surface is formed at a first guide member fixed to the reinforcing member;
the second guide surface is formed at a second guide member fixed to the reinforcing member and located above or below the first guide member; and
the pedal bracket includes: a first abutment part that abuts against and slides along the first guide surface due to the relative movement of the pedal bracket toward the rear of the automobile body; and a second abutment part that abuts against and slides along the second guide surface due to the relative movement of the pedal bracket toward the rear of the automobile body. The second abutment part is located closer to the front of the automobile body than the first abutment part.

Accordingly, the first abutment part first slides along the first guide surface when the pedal bracket is moved toward the rear of the automobile body because the first and second guide members are located one above the other while the second abutment part is located closer to the front of the automobile body than the first abutment part. Thus, the position of the pedal bracket is changed such that a rear part thereof is moved downward. Then, the second abutment part abuts against and slides along the second guide surface, thus changing the position of the pedal bracket such that the rear part thereof is moved further downward. Consequently, the movement of the pedal portion of the operating pedal toward the rear of the automobile body is suppressed.

In this manner, the position of the pedal bracket is sequentially changed using the two guide members. However, since both the guide members are located one above the other, it is unnecessary to provide, within the instrument panel, a large installation space for the guide members which is elongated in the longitudinal direction of the automobile body. Consequently, it becomes possible to easily design the layout of the guide members and other interior equipment within the instrument panel.

Further, when the pedal bracket is moved toward the rear of the automobile body, at what point in time the position of the pedal bracket is changed using the first guide surface, and at what point in time that of the pedal bracket is further changed using the second guide surface can be appropriately determined by adjusting the relative positional relationship between the first abutment part and the first guide surface, or the relative positional relationship between the second abutment part and the second guide surface.

When the pedal bracket bends from its front end portion as a bending point using the first and second guide surfaces, a straight line connecting the bending point with the first abutment part to extend in the longitudinal direction of the automobile body forms an angle with the first guide surface, and a straight line connecting the bending point with the second abutment part to extend in the longitudinal direction of the automobile body forms another angle with the second guide surface. Accordingly, when the pedal bracket is moved toward the rear of the automobile body, how much the position of the pedal bracket is changed using the first guide surface, and how much that of the pedal bracket is further changed using the second guide surface can be appropriately determined by adjusting these angles. Specifically, how much the position of the pedal bracket is changed can be appropriately determined by adjusting the level of each of the first and second abutment parts and/or the inclination angle of each of the first and second guide surfaces.

Moreover, when the pedal bracket bends from its front end portion as a bending point using the first and second guide surfaces, how much the position of the pedal bracket is changed can be appropriately determined by adjusting the length from the bending point to the first abutment part and/or the length from the bending point to the second abutment part.

As described above, according to this embodiment, it is easy to control how much and at what point in time the position of the pedal bracket is changed upon automobile collision, and it is possible to obtain the pedal support structure that allows greater design freedom.

The first and second guide members may be located one above the other such that they at least partially overlap with each other in plan view. It is preferable that the first and second guide surfaces are located to overlap with each other substantially across the entire length in plan view. Thus, it becomes unnecessary to longitudinally enlarge the installation space for the guide members which has to be ensured within the instrument panel, and the layout of the guide members within the instrument panel is further facilitated.

Suppose that the first and second guide surfaces are formed at a single guide member. In that case, if an excessive load is applied to the guide member when the first abutment part abuts against the first guide surface, this guide member is deformed to change the position and shape of the second guide surface. Consequently, the second abutment part might not abut against the second guide surface as planned, or the second abutment part might not smoothly slide along the second guide surface. As measures to prevent such a problem, the enhancement of strength of the guide member may be taken into consideration; however, such measures increase the weight and cost of the guide member.

To the contrary, according to the embodiment of the present invention, both the guide surfaces are formed at the separate guide members. Thus, even if the first guide member is broken, the influence of this breakage on the second guide member can be avoided, which is advantageous in certainly changing the position of the pedal bracket by using the second guide surface. In addition, since both the guide surfaces are formed at the separate guide members, both the guide surfaces can be easily formed.

It is preferable that the first and second abutment parts are located so that the second abutment part abuts against the second guide surface after the first abutment part has finished sliding along the first guide surface.

Therefore, the first and second abutment parts located at the pedal bracket will not simultaneously abut against the two guide surfaces located adjacent to the reinforcing member. Accordingly, it is possible to avoid the problem that both the abutment parts interfere with each other and do not smoothly slide along the guide surfaces. That is, the first and second abutment parts sequentially abut against the associated guide surfaces and smoothly slide along them.

It is preferable that:

a front end of the pedal bracket fixed to the dashpanel is formed with a point from which the pedal bracket bends when a downward force acts thereon;

the first abutment part is formed by the periphery of a first hollow or solid cylindrical pin member provided at the pedal bracket to extend in the widthwise direction of the automobile body;

the second abutment part is formed by the periphery of a second hollow or solid cylindrical pin member provided at the pedal bracket to extend in the widthwise direction of the automobile body; and given that a straight line passing through the bending point and the first pin member to extend in a longitudinal direction of the automobile body forms an angle $\theta 1$ (obtuse angle) with the first guide surface at the time when the first pin member abuts against the first guide surface with the movement of the pedal bracket toward the rear of the automobile body, while a straight line passing through the bending point and the second pin member to extend in the longitudinal direction of the automobile body forms an angle $\theta 2$ (obtuse angle) with the second guide surface at the time when the second pin member abuts against the second guide surface with the movement of the pedal bracket toward the rear of the automobile body, the angle $\theta 1$ is greater than the angle $\theta 2$.

When the pedal bracket is moved toward the rear of the automobile body upon automobile collision and the first and second pin members are abutted against the first and second guide surfaces, respectively, the magnitude of each impactive force applied to the reinforcing member is not determined by only the inclination angle of each guide surface but varied depending on each of the angles $\theta 1$ and $\theta 2$.

The pedal bracket is not bended until the first pin member abuts against the first guide surface, and the pedal bracket starts bending due to this abutment. Since the resistance generated when the pedal bracket starts bending is high, a great impactive force is likely to be applied to the reinforcing member at the time of the abutment. Therefore, in order to prevent the breakage of the reinforcing member, it is preferable to minimize this impactive force by increasing the angle θ1.

On the other hand, when the second pin member abuts against the second guide surface, the pedal bracket has already started bending; therefore, the resistance generated when the pedal bracket is further bended due to this abutment is low, and the impactive force applied to the reinforcing member at the time of the abutment is not so great. Consequently, it is possible to reduce the angle θ2, and thus it is possible to certainly suppress the movement of the pedal portion of the operating pedal toward the rear of the automobile body by increasing the amount of bending of the pedal bracket.

Further, it is preferable that:

a front end of the pedal bracket fixed to the dashpanel is formed with a point from which the pedal bracket bends when a downward force acts thereon; and the length from the bending point to the second abutment part is shorter than the length from the bending point to the first abutment part.

This is advantageous in increasing the amount of downward positional change of the pedal bracket when the second abutment part slides along the second guide surface, i.e., in suppressing the movement of the pedal portion of the operating pedal toward the rear of the automobile body.

Furthermore, in one preferred embodiment, a guide member formed with said one guide surface is fixed to the reinforcing member, and the pedal bracket is provided with a plurality of the abutment parts, and the abutment parts sequentially abut against and slide along the guide surface with the relative movement of the pedal bracket toward the rear of the automobile body.

Therefore, upon automobile collision, the plurality of abutment parts provided at the pedal bracket sequentially abut against the guide surface of the guide member fixed to the reinforcing member with the relative movement of the dashpanel toward the rear of the automobile body. Thus, the position of the pedal bracket can be more and more changed. Even if the entire guide mechanism is not longitudinally elongated, the load applied to the reinforcing member upon automobile collision can be reduced, the position of the pedal bracket can be greatly changed, and the movement of the pedal portion of the operating pedal toward the rear of the automobile body can be suppressed.

If the arrangement of the plurality of abutment parts is adjusted, it becomes possible to greatly change the position of the pedal bracket by the subsequent abutment part while reducing the load transmitted to the guide surface when the first abutment part is abutted against the guide surface. That is, greater design freedom is allowed in determining how much and at what point in time the position of the pedal bracket is changed.

In this embodiment, it is preferable that:

the plurality of abutment parts include first and second abutment parts;

the second abutment part is provided closer to the front of the automobile body than the first abutment part; and the second abutment part abuts against and slides along the guide surface after the first abutment part has been detached from the guide surface.

Thus, the position of the pedal bracket can be changed in two steps. Further, the first and second abutment parts do not simultaneously abut against the guide surface to interfere with each other, and the frictional resistance generated when the abutment parts slide along the guide surface does not increase. As a result, the positional change of the pedal bracket can be smooth and ensured, and the load transmitted to the reinforcing member can be reduced.

In the case where the aforementioned plurality of abutment parts include the first abutment part located toward the front of the automobile body and the second abutment part located toward the rear of the automobile body, the first abutment part may be detached from the guide surface after the second abutment part has been abutted against the guide surface.

In such a case, the situation where the first and second abutment parts simultaneously abut against the guide surface is brought about, and the load resulting from automobile collision is temporarily distributed to a region of the guide surface associated with the first abutment part and another region of the guide surface associated with the second abutment part. This is advantageous in preventing the damage of the guide member and in reducing the load regarding the second abutment part.

Furthermore, it is preferable that:

the plurality of abutment parts include first and second abutment parts;

the second abutment part is provided closer to the front of the automobile body than the first abutment part such that the first abutment part first slides along the guide surface and then the second abutment part slides along the guide surface; and the first and second abutment parts are disposed so that when the second abutment part slides along the guide surface, the pedal bracket creates a greater downward bending to cause a relative movement of the pedal portion of the operating pedal toward the front of the automobile body than when the first abutment part slides along the guide surface.

Upon automobile collision, a large collision load is likely to be applied to the guide member and the reinforcing member via the first abutment part. However, as described above, the bending amount of the pedal bracket is small when the first abutment part slides along the guide surface, and the collision load applied to the guide member and/or the reinforcing member is accordingly reduced. Consequently, the breakage of the guide member and/or the reinforcing member is avoided, which is advantageous in bending the pedal bracket by subsequently allowing the second abutment part to abut against and slide along the guide surface.

The abutment parts are each preferably formed by a hollow or solid cylindrical pin member.

In such a case, since the abutment parts each have line contact with the guide surface, the contact area of a sliding portion of each of the abutment parts is smaller than that of a sliding portion of a plate-like abutment part which has surface contact with the guide surface, and thus a sliding resistance can be reduced. Further, since the abutment parts are circular in cross section, the spacing between the abutment parts can be reduced, which is advantageous in designing layout.

Furthermore, since a hollow or solid cylindrical support shaft for supporting the operating pedal has high rigidity, this support shaft is preferably utilized as the first abutment part. Thus, it is unnecessary to additionally provide the first abutment member, which is advantageous from cost-cutting and layout standpoints.

Suppose that the operating pedal is a brake pedal. In that case, upon automobile collision, the driver brakes the automobile by stepping on the brake pedal in order to avoid this collision, and therefore, a load is likely to be applied to a foot of the driver. However, according to the present invention, since a large foot space can be maintained below a driver's seat, the effects of the present invention are more remarkably achieved.

Other features, aspects, and advantages of the present invention will become apparent from the following description of the invention which refers to the accompanying drawings.

DESCRIPTION OF THE PREFERRED EMBODIMENTS

Hereinafter, embodiments of the present invention will be described with reference to the accompanying drawings. The following embodiments are described essentially by way of preferred exemplification, and they are not intended to limit the present invention, objects to which the present invention is applied, and application of the present invention.

First Embodiment

Figure 1:
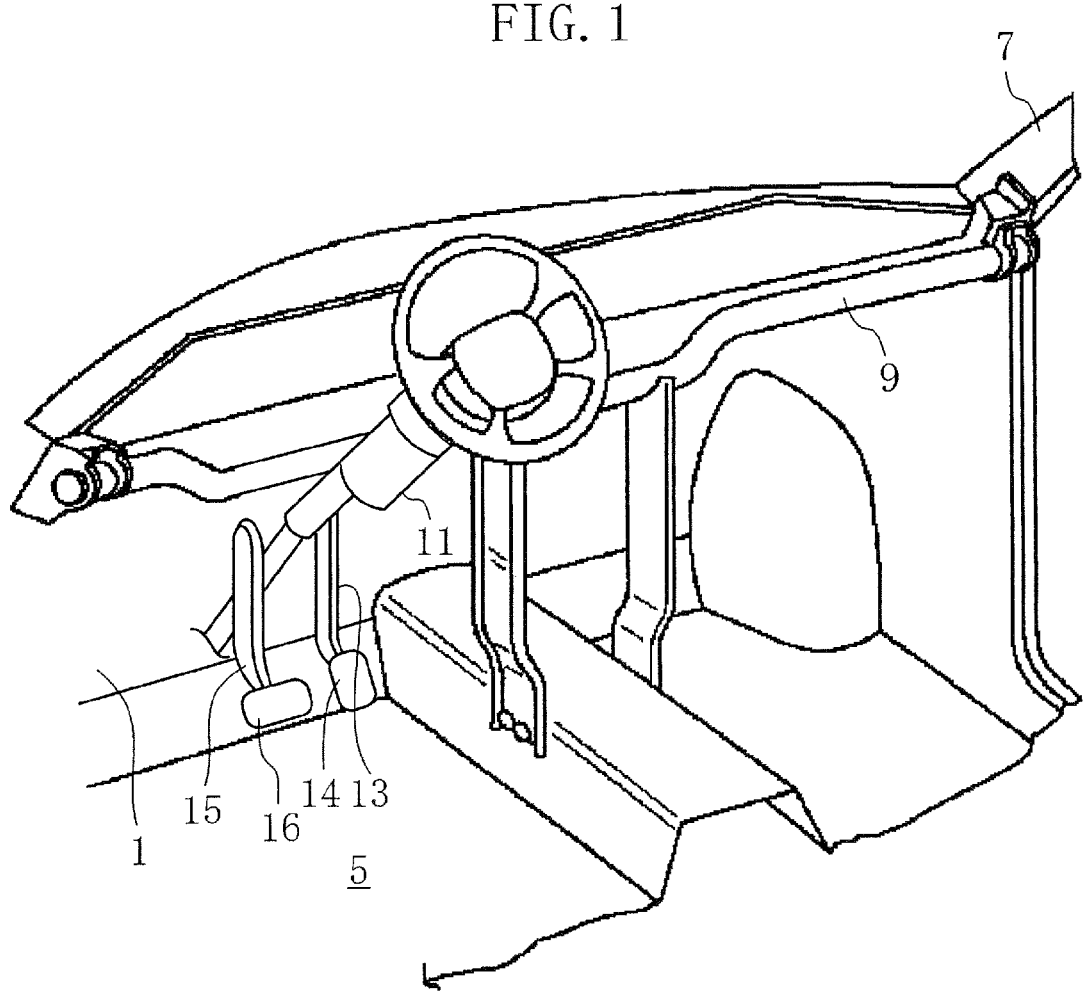
FIG. 1 is an oblique view illustrating a front part of a cabin of an automobile.
Figure 2:
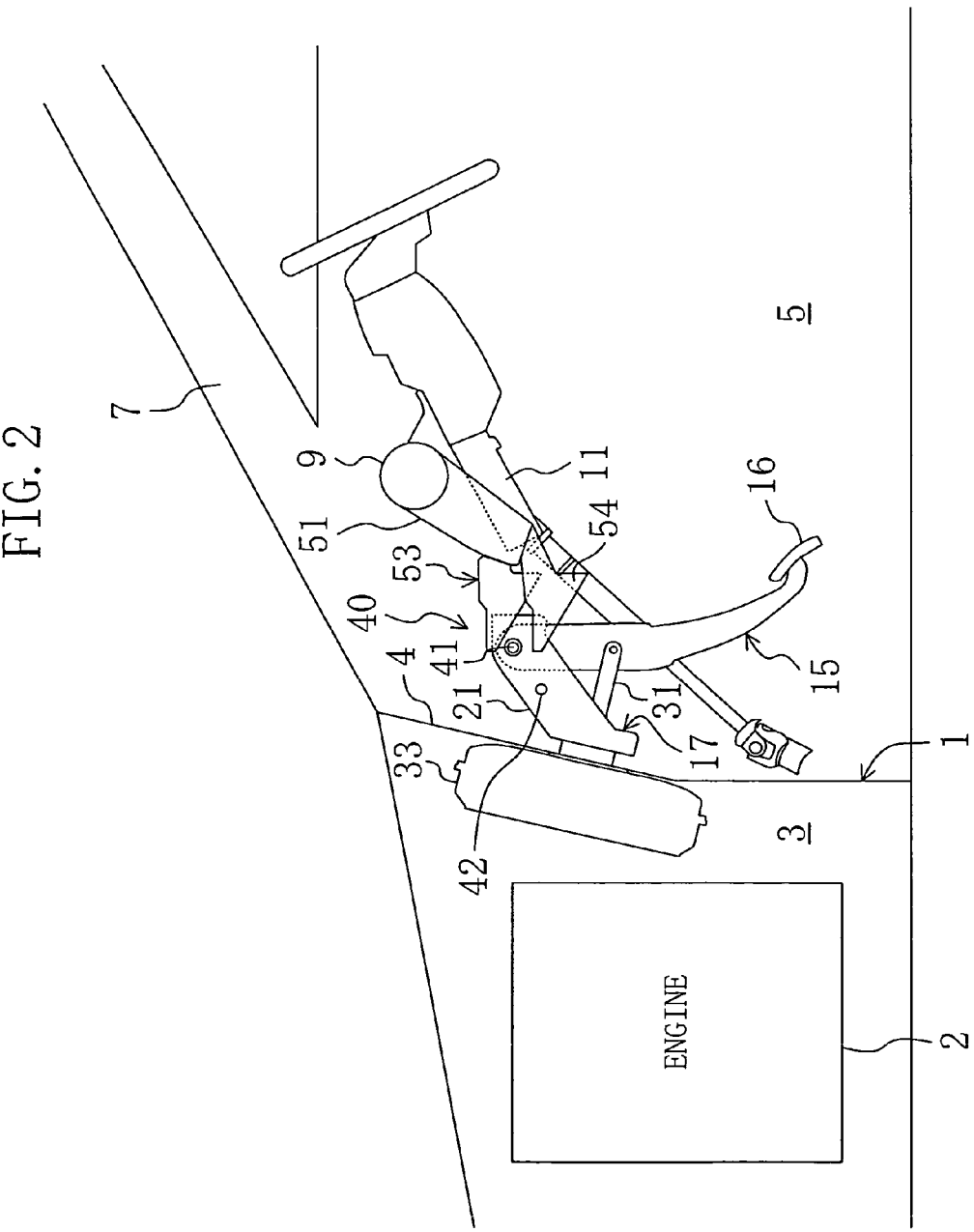
FIG. 2 is a side view illustrating a front section of an automobile body provided with a pedal support structure according to a first embodiment of the present invention.

FIG. 1 shows the inside of a front part of a cabin 5 of a left-hand drive automobile provided with an automotive pedal support structure. A dashpanel 1 constitutes a part of an automobile body, and serves as a partition between the cabin 5 and an engine room 3. As shown in FIG. 2, the engine room 3 that contains an engine 2 is provided in front of the dashpanel 1, while the cabin 5 is provided behind the dashpanel 1. An instrument panel (not shown) is located upwardly and rearwardly of the dashpanel 1 at a front end of the cabin 5, and a reinforcing member 9 extended in a widthwise direction of the automobile body is provided within this instrument panel.

The reinforcing member 9 is connected between front pillars 7 located at the right and left sides of the automobile body, and is provided to ensure a sufficient space for occupants in the cabin 5 upon automobile collision. A steering shaft 11 is fixed to the reinforcing member 9. The steering shaft 11 is sandwiched between a gas pedal 13 disposed on the right-hand side of the steering shaft 11 and a brake pedal 15 disposed on the left-hand side of the steering shaft 11. The gas pedal 13 and the brake pedal 15 are foot operated by a driver who is sitting in a driver's seat (not shown). The gas pedal 13 and the brake pedal 15 are each formed into a slim plate-like shape, and are provided at lower ends thereof with pedal portions 14 and 16, respectively, on which the driver puts his or her foot to step on them.

A pedal bracket 17 for supporting the brake pedal 15 is fixed to a rear face of an upper part 4 of the dashpanel 1 by using a bolt member. This bolt member is also used to attach a master vac 33 to a front face of the dashpanel 1, and passes through the dashpanel 1 to protrude from the rear face thereof.

The brake pedal 15 is supported at a rear end of the pedal bracket 17 by a pedal shaft 41 extended in the widthwise direction of the automobile body such that the brake pedal 15 can be swung forward and backward. A return spring (not shown) applies a force to the brake pedal 15 so that it returns toward the rear of the automobile body. An intermediate portion of the brake pedal 15 is connected with an operating rod (cylinder-side rod) 31. This operating rod 31 passes through the pedal bracket 17 and the upper part 4 of the dashpanel 1 and is connected to a master cylinder (not shown) at a rear end of the engine room 3 via the master vac 33 (servomechanism).

If the driver steps on the pedal portion 16 of the brake pedal 15 to pivot the brake pedal 15 in a clockwise direction in FIG. 2, the master vac 33 is actuated by being pushed by the operating rod 31, and a pressing force applied to the master cylinder is increased by the master vac 33. As a result, wheels of the automobile are braked hydraulically by the master cylinder.

Described below is a structure that is adopted in order to suppress the movement of the pedal portion 16 of the brake pedal 15 toward the rear of the automobile body upon automobile collision by changing the position of the pedal bracket 17.

As shown in FIG. 2, a guide bracket 51 extended forward and obliquely downward is fixed to the reinforcing member 9, a first guide member 53 is fixed to a front face of a lower part of the guide bracket 51, and a second guide member 54 is fixed to a lower end face of the guide bracket 51.

Figure 3:
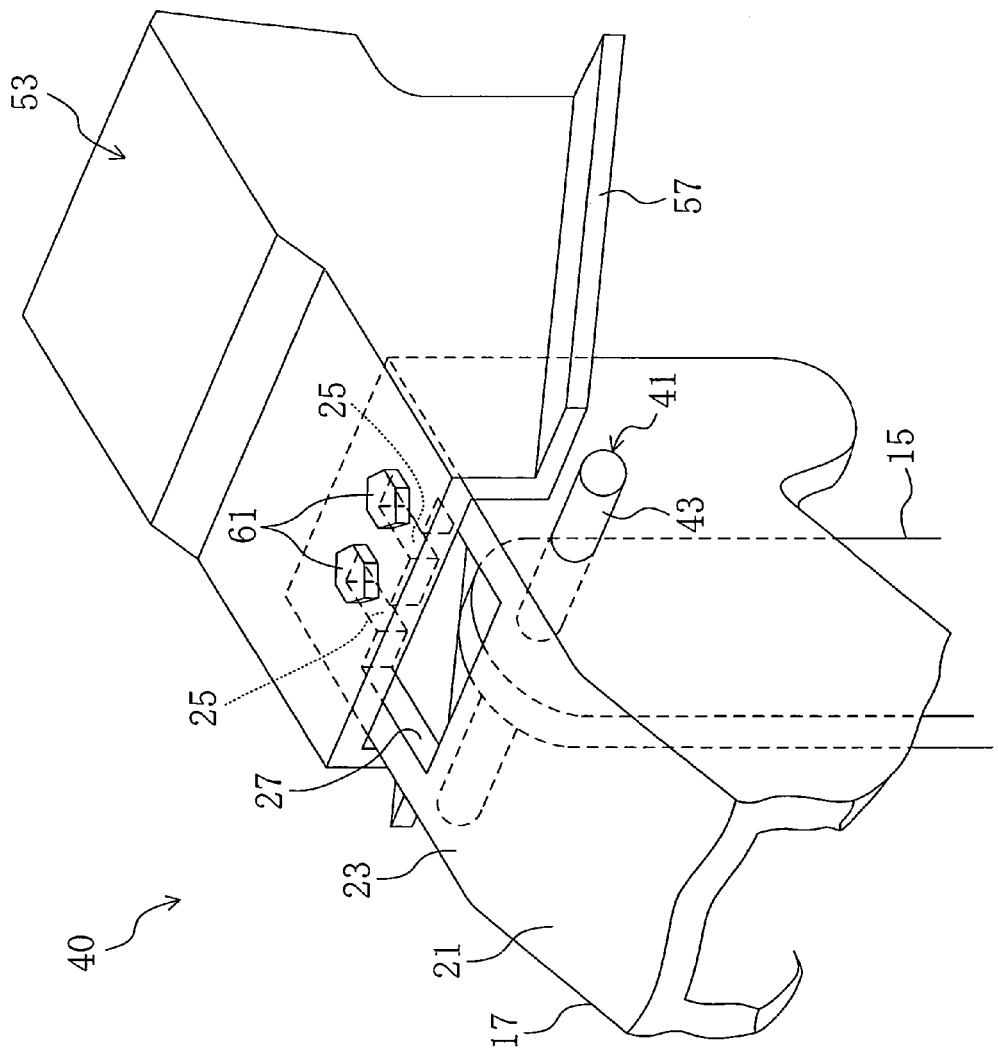
FIG. 3 is an oblique view illustrating a fastening mechanism according to the first embodiment.

As shown in FIG. 3, the pedal bracket 17 and the first guide member 53 are fastened to each other by a fastening mechanism 40 that allows the detachment of the pedal bracket 17 toward the rear of the automobile body. Further, the pedal bracket 17 is provided with an abutment pin 42. The pedal shaft 41 of the pedal bracket 17, the abutment pin 42 and both the guide members 53 and 54 constitute a guide mechanism for changing the position of the pedal bracket 17 so as to suppress the movement of the pedal portion 16 of the brake pedal 15 toward the rear of the automobile body when the pedal bracket 17 is moved toward the rear of the automobile body.

Figure 4:
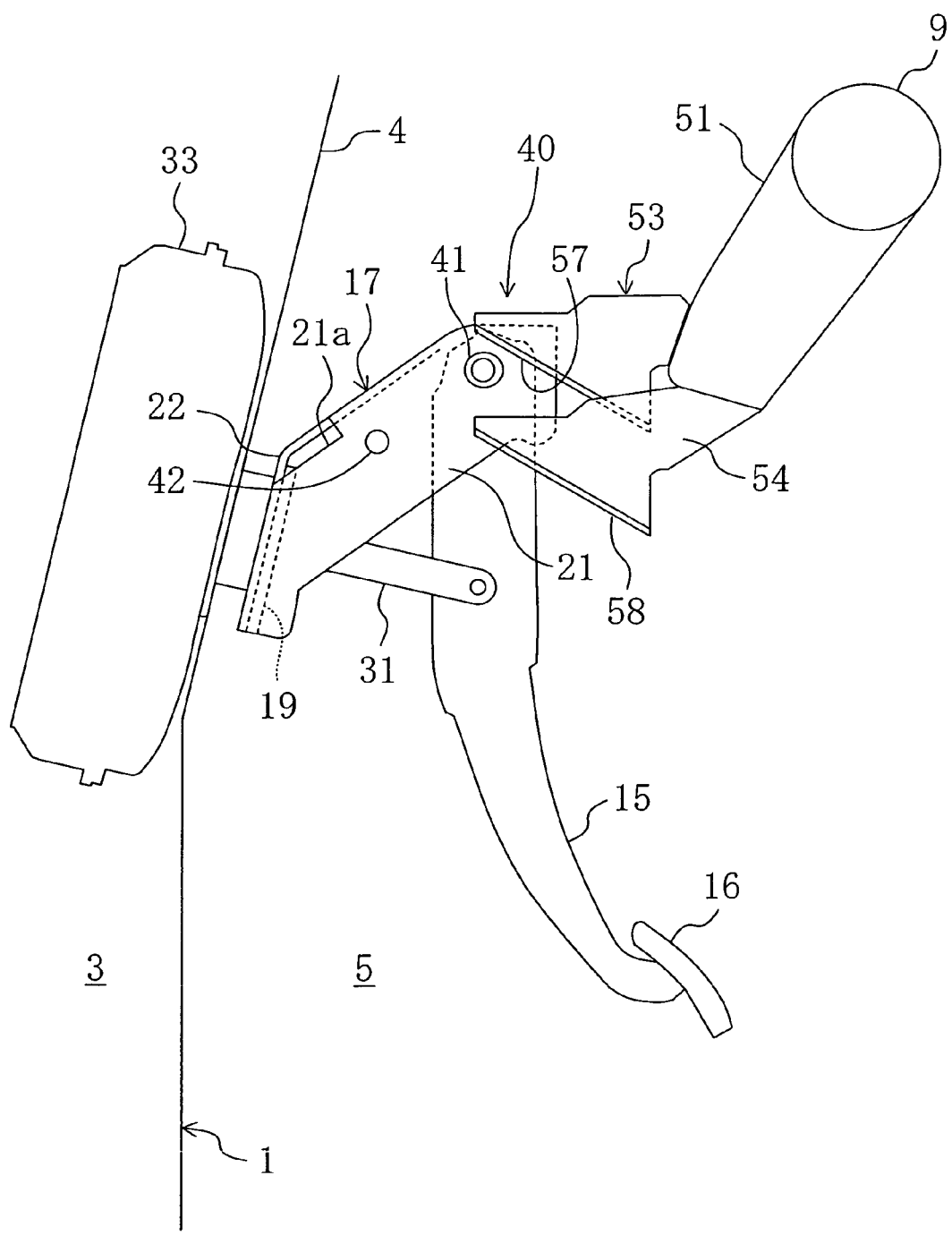
FIG. 4 is a side view illustrating a guide mechanism according to the first embodiment.

As shown in FIG. 4, the pedal bracket 17 includes: a rectangular plate-like fixation part 19 attached to the upper part 4 of the dashpanel 1; and a support part 21 extended backward and obliquely upward from the fixation part 19. A cutout 21a is provided at upper portions of both side walls of the support part 21, and thus a bending point 22 for the positional change of the pedal bracket 17 (i.e., a fragile portion that can be easily bended downward) is formed at a top of a base end (front end) of the support part 21.

First, the fastening mechanism 40 will be described in detail. As shown in FIG. 3, at a rear end upper portion 23 of the support part 21 of the pedal bracket 17, two slots 25 that are aligned right and left and extended in parallel with each other in a longitudinal direction of the automobile body are formed. Front ends of both the slots 25 are communicated with an opening 27 formed in the support part 21.

On the other hand, the first guide member 53 is formed into a channel shape opened at its lower side, and a front portion of the first guide member 53 is externally fitted to a rear end of the support part 21 of the pedal bracket 17 from above. Bolts 61 passed through the slots 25 are used with nuts (not shown), and thus the pedal bracket 17 and the first guide member 53 are fastened together.

The pedal bracket 17 is connected at its front end to the dashpanel 1, and is connected at its rear end to the guide member 53 adjacent to the reinforcing member 9 by the fastening mechanism 40. Therefore, when automobile collision is not caused, the pedal bracket 17 functions as a rigid member that firmly supports the brake pedal 15. On the other hand, if the pedal bracket 17 is strongly pushed toward the rear of the automobile body due to automobile collision, the bolts 61 are disengaged from front-end openings of the slots 25. Thus, the fastening of the pedal bracket 17 to the first guide member 53 is loosened, and the pedal bracket 17 is detached backward from the first guide member 53.

Next, the guide mechanism will be described. As shown in FIG. 3, the pedal shaft 41 of the pedal bracket 17 passes through both the right and left side walls of the support part 21 to protrude outward therefrom. That is, the pedal shaft 41 is provided at its both ends with protruded portions 43. When an automobile collision (in particular, a forward collision) occurs, both the protruded portions 43 abut against the first guide member 53 adjacent to the reinforcing member 9. In other words, both the protruded portions 43 of the pedal shaft 41 according to the present embodiment constitute a first abutment part of the guide mechanism.

The abutment pin 42 is located closer to the front of the automobile body than the pedal shaft 41, is extended in the widthwise direction of the automobile body, and is supported at the right and left side walls of the pedal bracket 17. Both ends of the abutment pin 42 pass through these right and left side walls to protrude outward therefrom. That is, the abutment pin 42 is provided at its both ends with protruded portions. Both the protruded portions of the abutment pin 42 constitute a second abutment part that abuts against the second guide member 54. The length from the bending point 22 of the pedal bracket 17 to the abutment pin (second abutment part) 42 is shorter than the length from the bending point 22 to the pedal shaft (first abutment part) 41.

The first guide member 53 includes, at lower ends of the right and left side walls thereof, an outwardly projected flange, and the lower face of this flange is formed as a first guide surface 57 on which both the protruded portions 43 of the pedal shaft 41 abut and slide. As also shown in FIG. 4, the first guide surface 57 is inclined to become gradually lowered toward the rear of the automobile body.

The second guide member 54 is located below the first guide member 53, and includes: right and left side walls extended from the lower face of the guide bracket 51 of the reinforcing member 9 toward the front of the automobile body; and an outwardly-projected flange at lower ends of these right and left side walls. The lower face of this flange is formed as a second guide surface 58 on which the abutment pin (second abutment part) of the pedal bracket 17 abuts and slides. The second guide surface 58 is also inclined to become gradually lowered toward the rear of the automobile body like the first guide surface 57.

Furthermore, the first and second guide surfaces 57 and 58 are located to overlap with each other in plan view. To be more specific, the first and second guide surfaces 57 and 58 are located at the approximately same position in the longitudinal direction of the automobile body, and are disposed one above the other. In the present embodiment, the first and second guide surfaces 57 and 58 are approximately parallel to each other. In other words, both the guide surfaces 57 and 58 are inclined at the approximately same angle.

In the above-described pedal support structure, if the automobile has a collision (in particular, a forward collision) with an obstacle while the driver is stepping on the brake pedal 15 to brake the automobile, a front section of the automobile body begins to crush, and the engine 2 within the engine room 3 begins to move backward. Accordingly, the pedal bracket 17 is pushed backward by the engine 2 via the master vac 33 and the dashpanel 1.

If the pressing force of the engine 2 is greater than the fastening force of the fastening mechanism 40 which fastens the pedal bracket 17 to the first guide member 53, the pedal bracket 17 is moved toward the rear of the automobile body with respect to the first guide member 53. Thus, the bolts 61 of the fastening mechanism 40 move from rear ends of the slots 25 toward front ends thereof, and then make their way to the opening 27. Therefore, the fastening of the pedal bracket 17 to the first guide member 53 is loosened so that the pedal bracket 17 is detached backward, and only a part of the pedal bracket 17 adjacent to the dashpanel 1 is fixed in a cantilever manner. In this state, the pedal bracket 17 is moved toward the rear of the automobile body.

Thereafter, the protruded portions 43 of the pedal shaft (abutment part) 41 abut against the downwardly inclined first guide surface 57, and start to slide along the first guide surface 57.

Since the pedal shaft 41 abuts against the first guide surface 57 after the fastening of the fastening mechanism 40 has been loosened, the guide mechanism does not inhibit the loosening of fastening of the fastening mechanism 40, and thus the fastening is smoothly loosened.

Further, since the pedal shaft 41 abuts against the first guide surface 57 while moving toward the rear of the automobile body, the frictional resistance in the initial sliding does not increase, and thus the pedal shaft 41 smoothly slides. Therefore, when the pedal shaft 41 abuts against the first guide surface 57, it is possible to avoid the application of a large collision load on the first guide member 53.

Furthermore, the first guide member 53 is fixed to the front face of the guide bracket 51 extended downward from the reinforcing member 9. Thus, even if a load applied to the first guide member 53 is increased, this load acts as a torsional force for the reinforcing member 9 via the guide bracket 51. Accordingly, a large bending force will not be applied to the reinforcing member 9, and therefore, the breakage of the reinforcing member 9 can be avoided.

Figure 5:
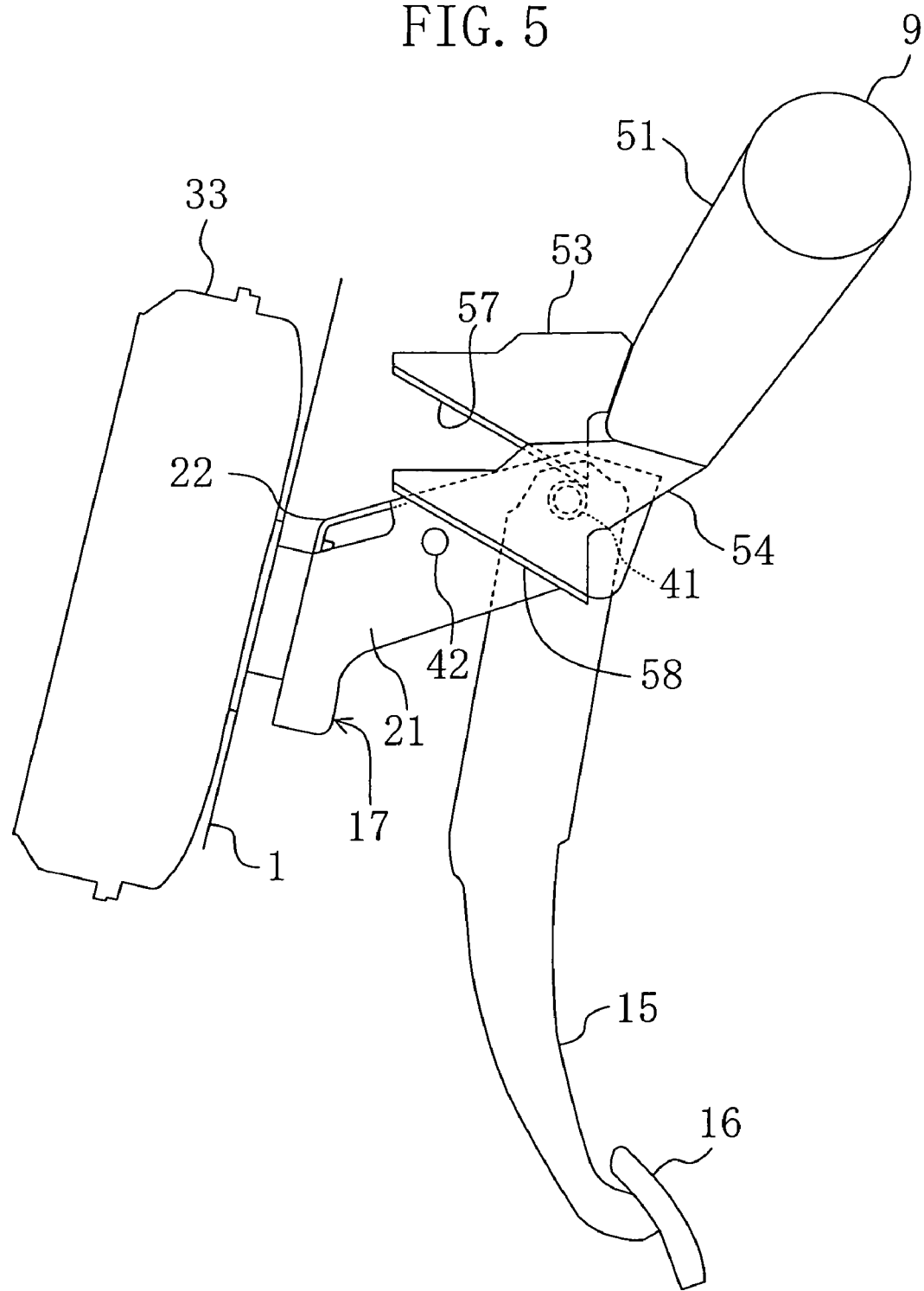
FIG. 5 is a side view illustrating the state in which a first abutment part of the guide mechanism finishes sliding along a first guide surface.

Then, as shown in FIG. 5, due to the sliding of the pedal shaft 41 along the first guide surface 57, the rear end of the pedal bracket 17 is forcibly pushed downward, and the pedal bracket 17 is bended at the bending point 22 located at the base end thereof. As a result, the pedal bracket 17 is bended downward around the bending point 22.

In this case, since the first guide surface 57 has a gentle inclination, a reaction force applied to the reinforcing member 9 via the first guide member 53 does not increase, which serves in favor of the prevention of breakage of the reinforcing member 9.

Figure 6:
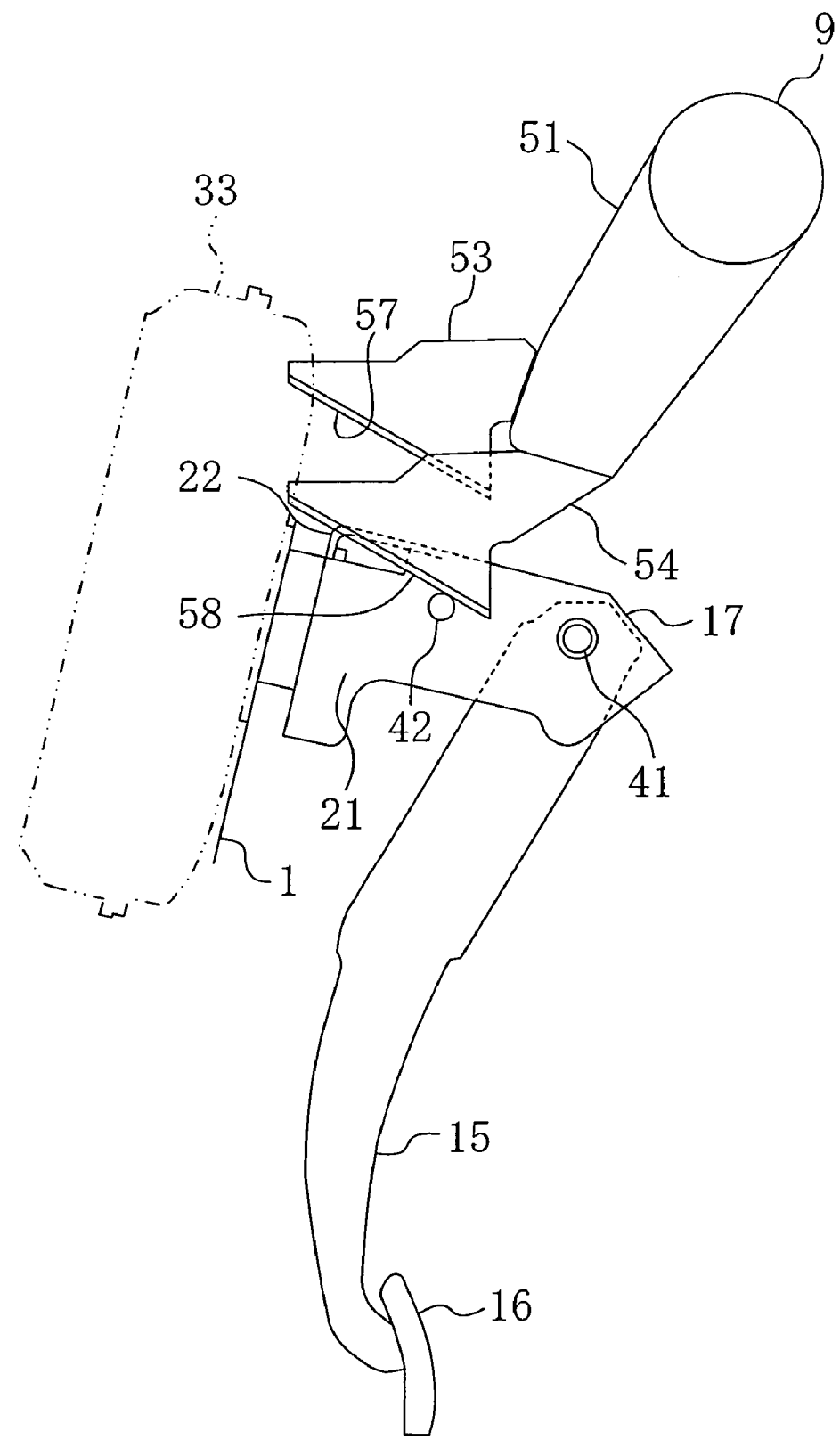
FIG. 6 is a side view illustrating the state in which a second abutment part of the guide mechanism is sliding along a second guide surface.

As shown in FIG. 6, after the pedal shaft 41 has finished sliding along the first guide surface 57, the abutment pin (second abutment part) 42 then abuts against and slides along the downwardly inclined second guide surface 58 of the second guide member 54. At this time, the pedal shaft 41 is not abutted against the first guide surface 57, and therefore, the pedal shaft 41 does not inhibit the sliding of the abutment pin 42 along the second guide surface 58.

Although the inclination angle of the second guide surface 58 is approximately similar to that of the first guide surface 57, the distance between the bending point 22 of the pedal bracket 17 and the abutment pin 42 is shorter than the distance between the bending point 22 and the pedal shaft 41 serving as the first abutment part. Therefore, the bending amount of the pedal bracket 17 when the abutment pin 42 slides along the second guide surface 58 is greater than that of the pedal bracket 17 when the pedal shaft 41 slides along the first guide surface 57. As a result, the movement of the pedal portion 16 of the brake pedal 15 toward the rear of the automobile body is suppressed.

Further, the abutment pin 42 abuts against the second guide surface 58 while moving toward the rear of the automobile body. Therefore, the frictional resistance in the initial sliding of the abutment pin 42 does not increase, and thus the abutment pin 42 smoothly slides; in addition, it becomes possible to avoid the application of a large collision load on the second guide member 54 and the reinforcing member 9.

Furthermore, even if the first guide member 53 is deformed or broken before the abutment pin 42 abuts against the second guide surface 58, the second guide member 54 is unlikely to be influenced by the deformation and/or breakage of the first guide member 53 because the second guide member 54 is formed separately from the first guide member 53 and is located at a position different from that of the first guide member 53. That is, it is possible to allow the abutment pin 42 to abut against and slide along the second guide surface 58 of the second guide member 54 with certainty.

Accordingly, even if the automobile collides with an obstacle to move the engine 2 backward, a large foot space is ensured for the driver, and thus a large load is prevented from being applied to the foot of the driver stepping on the pedal portion 16.

Second Embodiment

Figure 7:
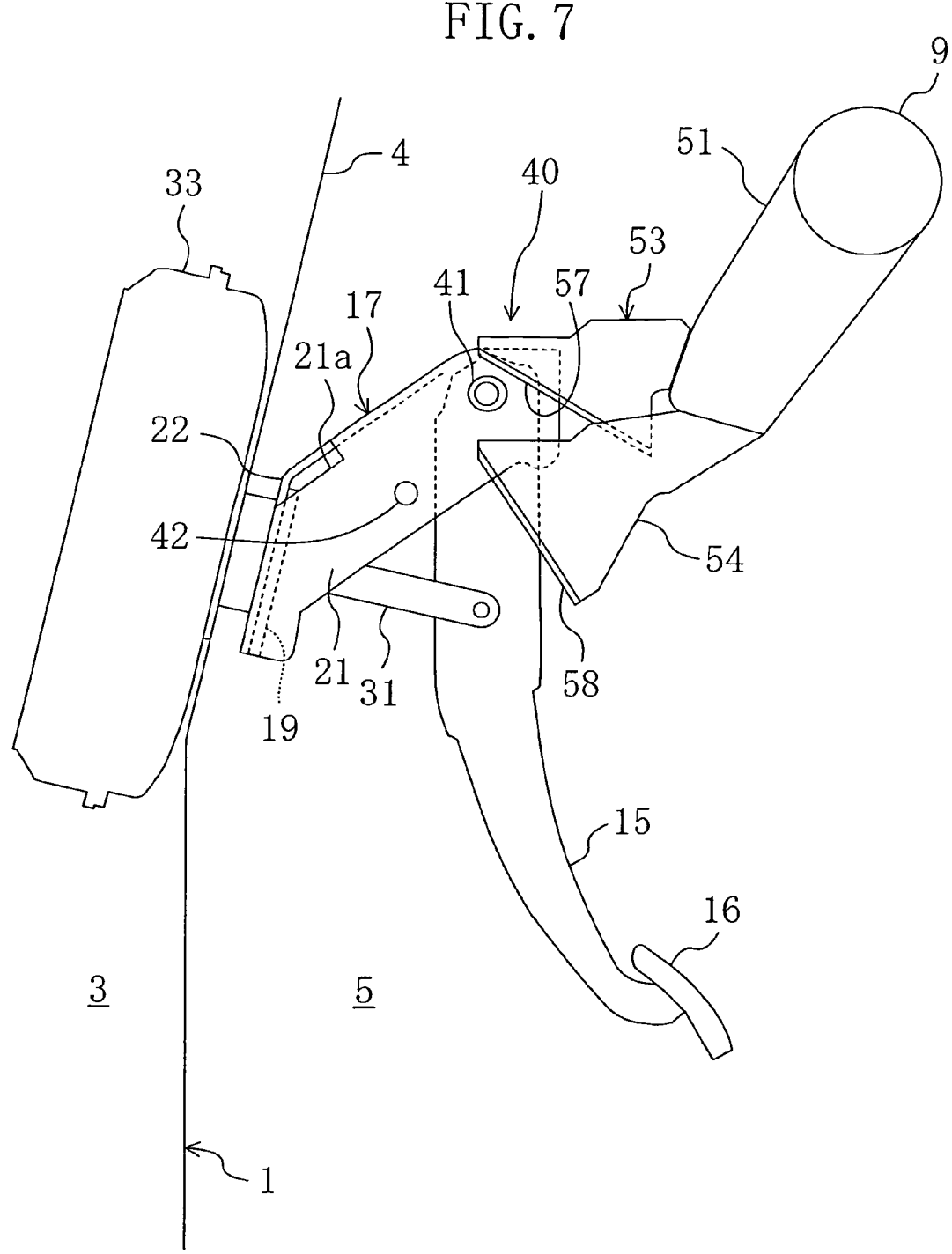
FIG. 7 is a side view illustrating a guide mechanism according to a second embodiment of the present invention.
Figure 8:
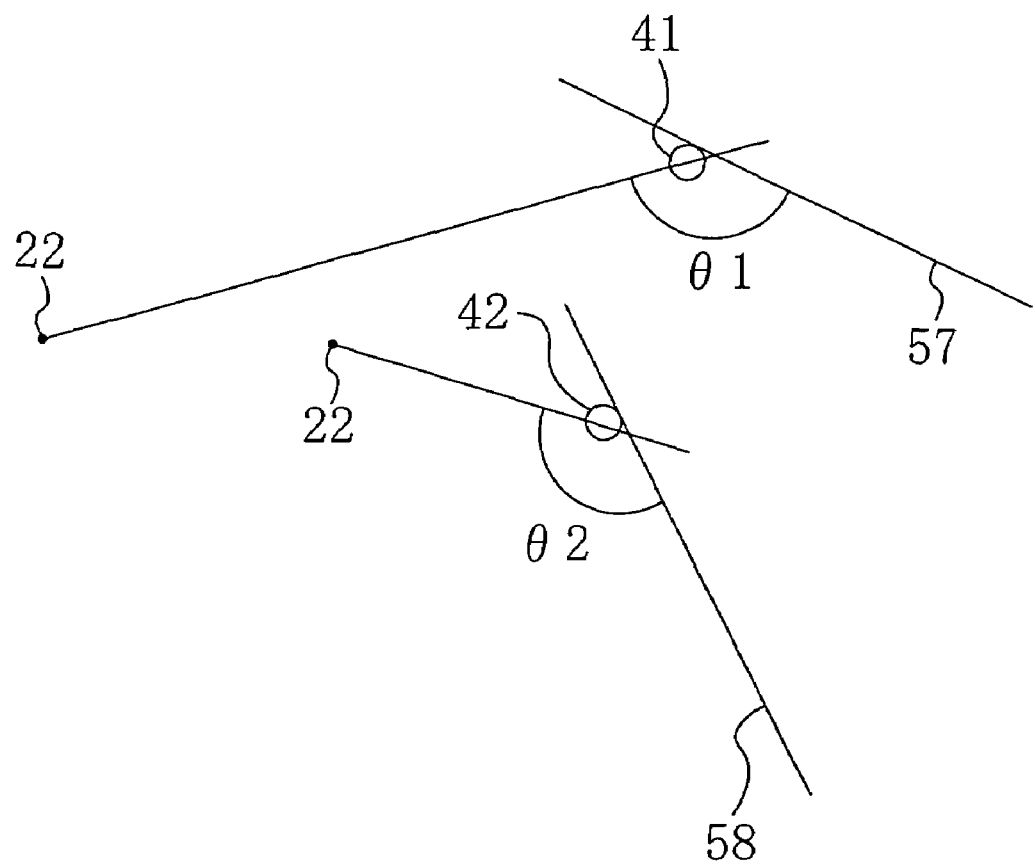
FIG. 8 is a schematic diagram illustrating the relationship between an angle θ1 and an angle θ2 in the second embodiment.
Figure 9:
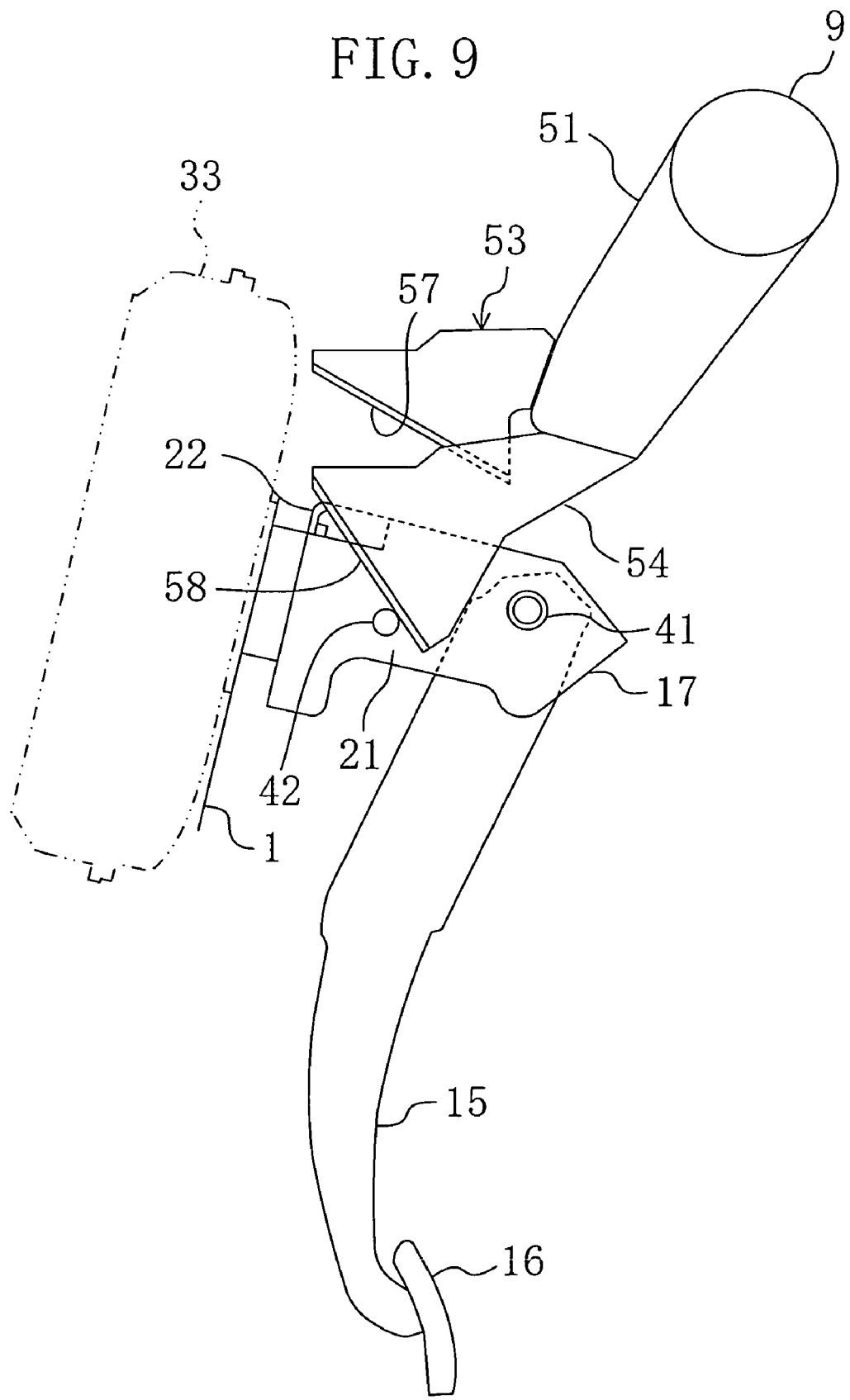
FIG. 9 is a side view illustrating the state in which a second abutment part slides along a second guide surface in the second embodiment.

A second embodiment of the present invention is illustrated in FIGS. 7 through 9. It should be noted that in FIGS. 7 through 9, the same components as those in the first embodiment are identified by the same reference characters, and the description thereof will be omitted.

As shown in FIG. 7, the second embodiment is characterized in that the inclination of the second guide surface 58 of the second guide member 54 is steeper than that of the first guide surface 57 of the first guide member 53.

As schematically shown in FIG. 8, a straight line, passing through the bending point 22 and the pedal shaft 41 to extend in the longitudinal direction of the automobile body, forms an angle $\theta 1$ with the first guide surface 57 at the time when the pedal shaft (first pin member) 41 abuts against the first guide surface 57 due to the movement of the pedal bracket 17 toward the rear of the automobile body, while a straight line, passing through the bending point 22 and the abutment pin 42 to extend in the longitudinal direction of the automobile body, forms an angle $\theta 2$ with the second guide surface 58 at the time when the abutment pin (second pin member) 42 abuts against the second guide surface 58. As can be seen from FIG. 8, the angle $\theta 1$ is greater than the angle $\theta 2$.

When the pedal shaft 41 abuts against the first guide surface 57, an impactive force applied to the reinforcing member 9 is likely to increase because this abutment starts the bending of the pedal bracket 17. However, since the angle $\theta 1$ is greater, the increase of this impactive force is avoided, which is advantageous in preventing the breakage of the reinforcing member 9.

On the other hand, when the abutment pin 42 abuts against the second guide surface 58, the amount of bending of the pedal bracket 17 during the sliding of the abutment pin 42 along the second guide surface 58 is increased as shown in FIG. 9 because the angle $\theta 2$ is smaller. Thus, it becomes possible to suppress the movement of the pedal portion 16 of the brake pedal 15 toward the rear of the automobile body with much more certainty.

Since the abutment pin 42 abuts against the second guide surface 58 after the pedal bracket 17 has already started bending, the resistance generated when the pedal bracket 17 is further bended due to this abutment is low, and thus an impactive force applied to the reinforcing member 9 upon abutment is not so large.

In the present embodiment, the distance between the bending point 22 of the pedal bracket 17 and the pedal shaft 41 is longer than the distance between the bending point 22 and the abutment part 42, and the angle $\theta 1$ is greater than the angle $\theta 2$. Thus, it becomes possible to considerably change the position of the pedal bracket 17 downward without applying a great impactive force to the reinforcing member 9, which is advantageous in suppressing the movement of the pedal portion 16 of the brake pedal 15 toward the rear of the automobile body.

Third Embodiment

Figure 10:
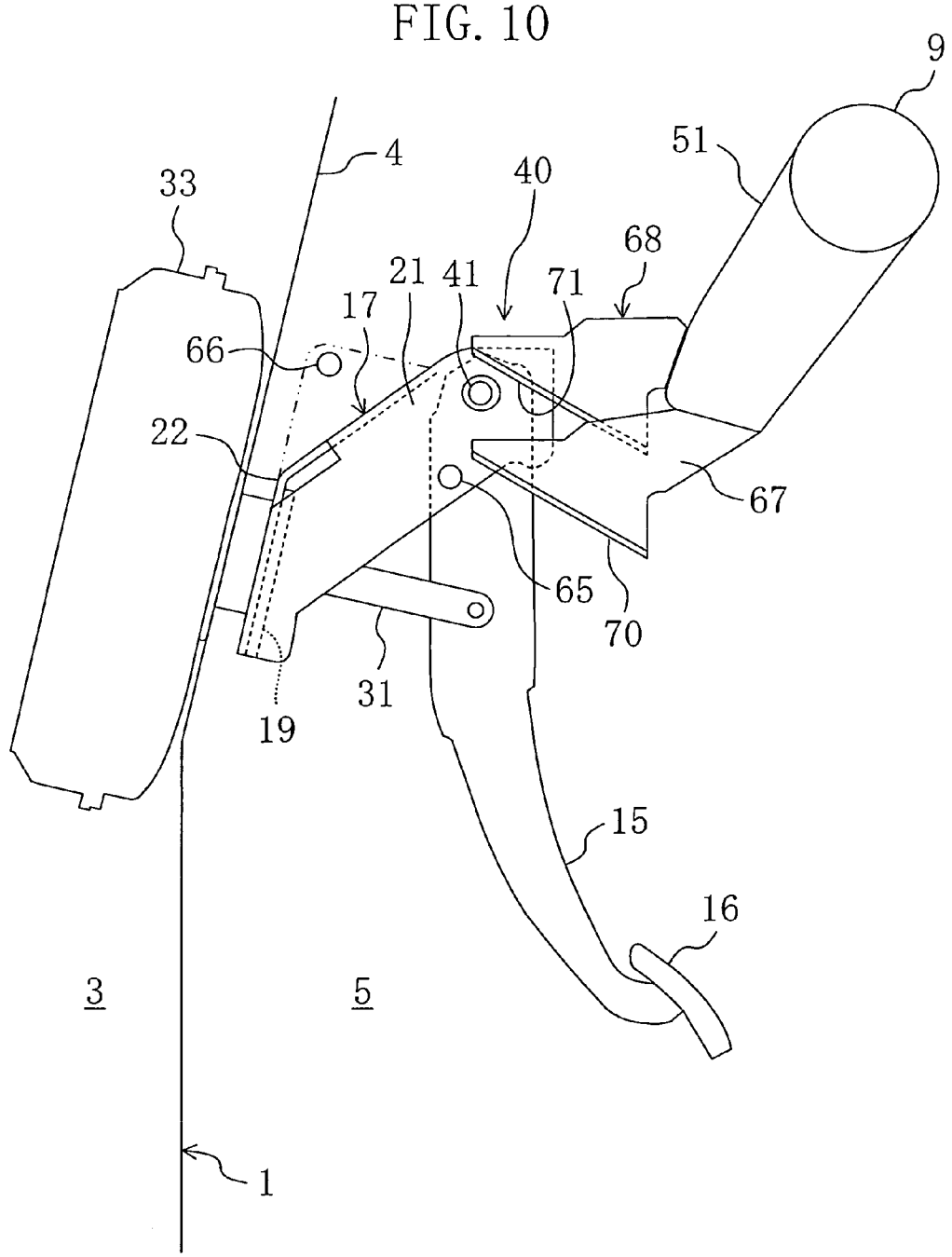
FIG. 10 is a side view illustrating a guide mechanism according to a third embodiment of the present invention.

A third embodiment of the present invention is illustrated in FIG. 10. It should be noted that in FIG. 10, the same components as those in the first embodiment are identified by the same reference characters, and the description thereof will be omitted.

In the third embodiment, unlike the first embodiment, a first guide member 67 having a first guide surface 70 is located below a second guide member 68 having a second guide surface 71 (that is, the second guide member 68 is located above the first guide member 67). Both the guide members 67 and 68 in the present embodiment are substantially formed in the same way as both the guide members 53 and 54 in the first embodiment. A first abutment pin 65 that abuts against and slides along the lower first guide surface 70 is located at a lower side of a rear part of the pedal bracket 17, while a second abutment pin 66 that abuts against and slides along the upper second guide surface 71 is located at an upper portion of a front end of the pedal bracket 17 (i.e., a protruded part of the pedal bracket 17 indicated by the chain double-dashed line in FIG. 10).

Both the abutment pins 65 and 66 are located so that the distance between the bending point 22 of the pedal bracket 17 and the second abutment pin 66 is shorter than the distance between the bending point 22 of the pedal bracket 17 and the first abutment pin 65.

In the present embodiment, when the pedal bracket 17 is moved toward the rear of the automobile body, first, the first abutment pin 65, located below the second abutment pin 66, abuts against and slides along the lower first guide surface 70. Thus, the pedal bracket 17 is bended at the bending point 22, and the position of the pedal bracket 17 is changed downward.

After the sliding of the first abutment pin 65 along the first guide surface 70 has been finished, the second abutment pin 66, located above the first abutment pin 65, then abuts against and slides along the upper second guide surface 71. Thus, the pedal bracket 17 is further bended at the bending point 22, and the position of the pedal bracket 17 is greatly changed downward.

Also in the present embodiment, the distance between the bending point 22 and the second abutment pin 66 is shorter than the distance between the bending point 22 and the first abutment pin 65. Therefore, the positional change of the pedal bracket 17 when the second abutment pin 66 slides along the second guide surface 71 is greater than that of the pedal bracket 17 when the first abutment pin 65 slides along the first guide surface 70. Other effects of the present embodiment are similar to those of the first embodiment.

Fourth Embodiment

Figure 11:
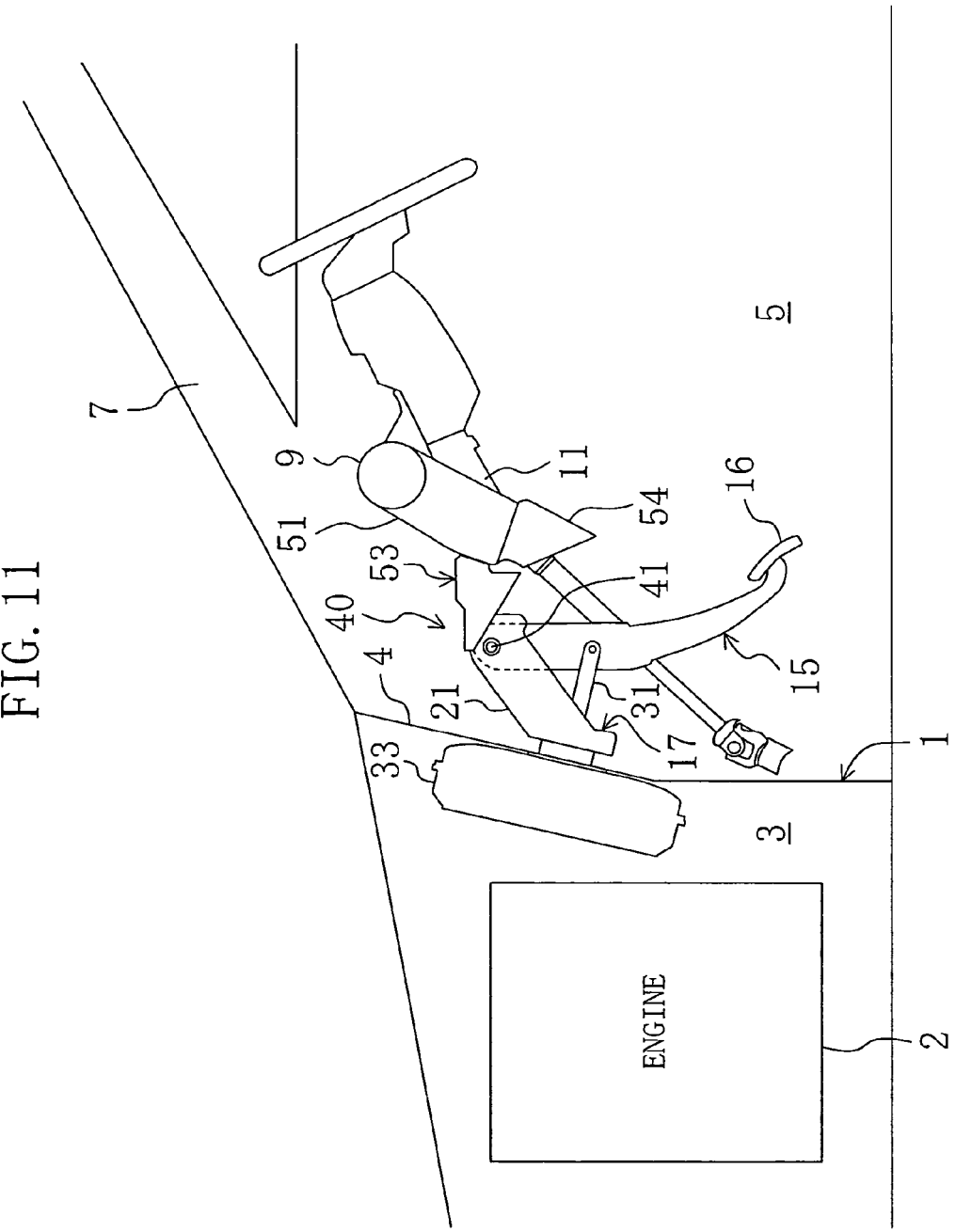
FIG. 11 is a side view illustrating a front section of an automobile body provided with a pedal support structure according to a fourth embodiment of the present invention.
Figure 12:
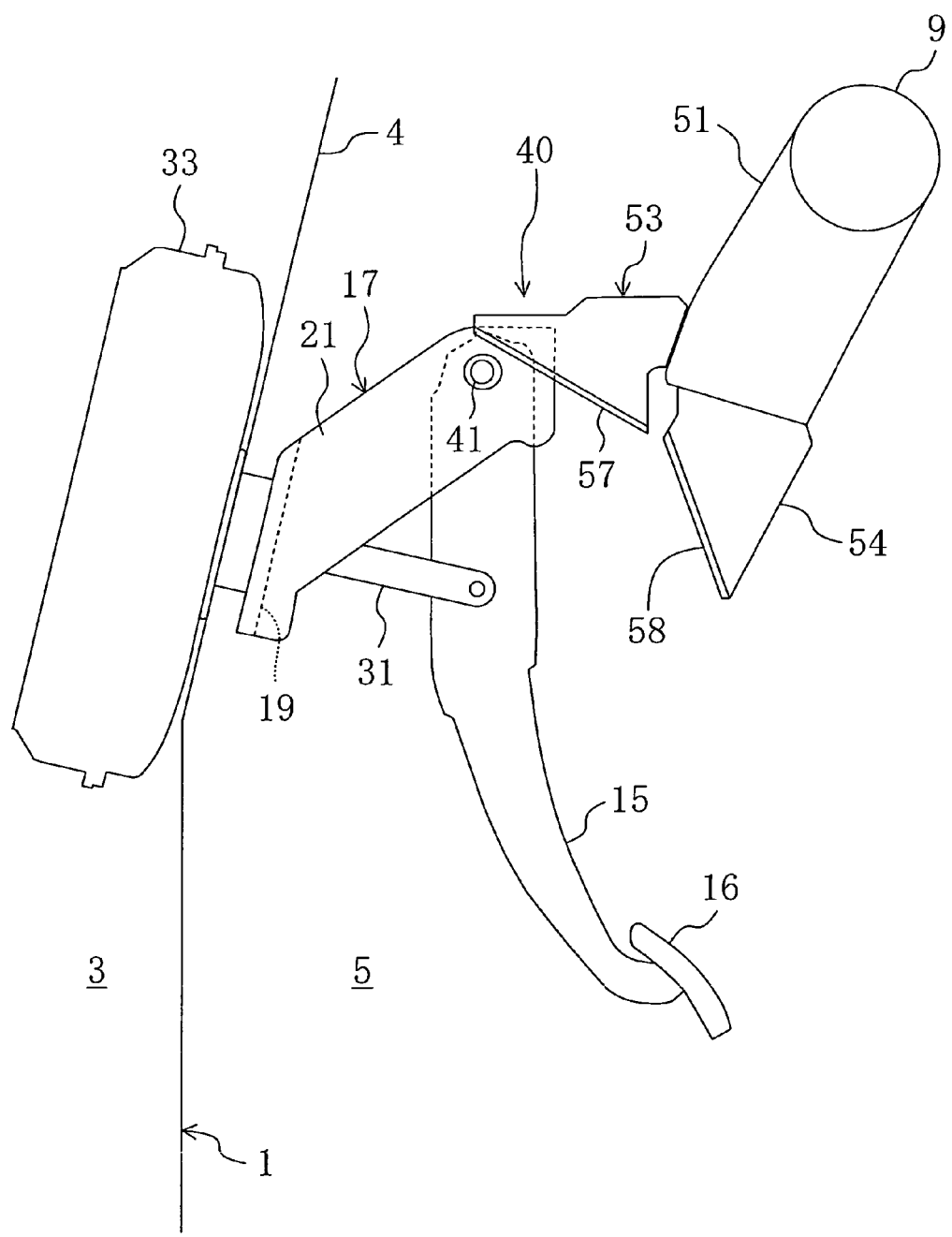
FIG. 12 is a side view illustrating a guide mechanism according to the fourth embodiment when automobile collision is not caused.
Figure 13:
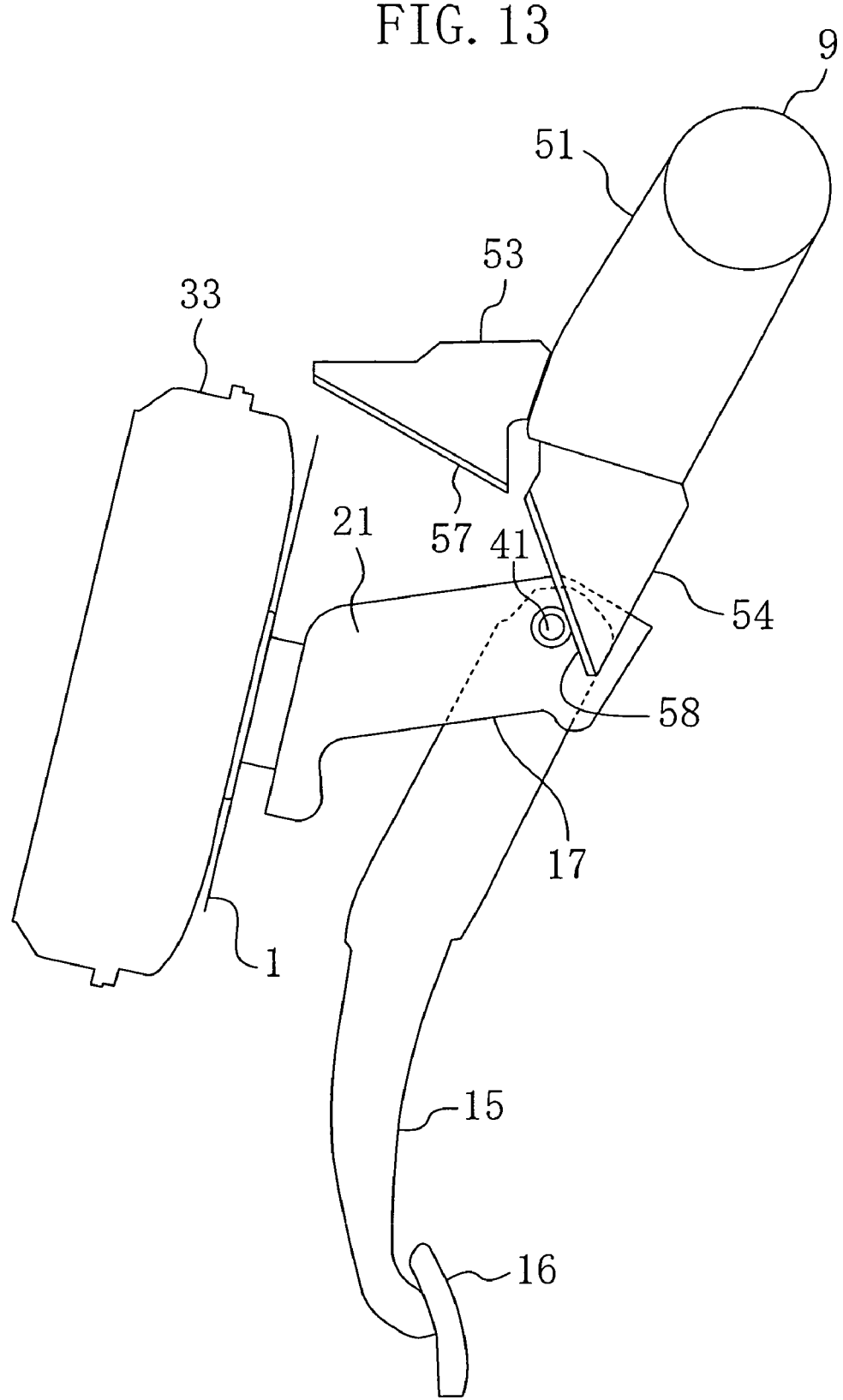
FIG. 13 is a side view illustrating the guide mechanism according to the fourth embodiment when automobile collision is caused.

A fourth embodiment of the present invention is illustrated in FIGS. 11 through 13. It should be noted that the same components as those in the first embodiment are identified by the same reference characters, and the description thereof will be omitted.

Also in the present embodiment, like the first embodiment, the guide bracket 51 extended forward and obliquely downward is fixed to the reinforcing member 9, the first guide member 53 is fixed to the front face of the lower part of the guide bracket 51, and the second guide member 54 is fixed to the lower end face of the guide bracket 51 as shown in FIGS. 11 and 12. The pedal bracket 17 and the first guide member 53 are fastened to each other by the fastening mechanism 40 that allows the detachment of the pedal bracket 17 toward the rear of the automobile body. Further, both the guide members 53 and 54 and the pedal shaft 41 of the pedal bracket 17 constitute a guide mechanism for changing the position of the pedal bracket 17 so as to suppress the movement of the pedal portion 16 of the brake pedal 15 toward the rear of the automobile body when the pedal bracket 17 is moved toward the rear of the automobile body.

The fastening mechanism 40 and the first guide member 53 are formed in the same way as those in the first embodiment. However, the second guide member 54 of the fourth embodiment is different from that of the first embodiment, and only one abutment part is provided in the fourth embodiment although the pedal shaft 41 constitutes the abutment part.

The second guide member 54 is formed into a channel shape opened at its lower side like the first guide member 53 and is extended in the longitudinal direction of the automobile body. The second guide member 54 includes, at lower ends of right and left side walls thereof, an outwardly projected flange. The lower face of this flange is formed as the second guide surface 58 on which both the protruded portions 43 of the pedal shaft 41 abut and slide. Although the second guide surface 58 is also inclined to become gradually lowered toward the rear of the automobile body like the first guide surface 57, the inclination of the second guide surface 58 is steeper than that of the first guide surface 57. Besides, the second guide surface 58 is extended downward from a position in the vicinity of the lowermost region of a rear end of the first guide surface 57.

In the above-described pedal support structure, when the pedal bracket 17 is moved toward the rear of the automobile body upon automobile collision and the fastening of the pedal bracket 17 to the first guide member 53 by the fastening mechanism 40 is loosened to detach the pedal bracket 17 backward, the protruded portions 43 of the pedal shaft (abutment part) 41 abut against the downwardly inclined first guide surface 57 of the first guide member 53 and start to slide along the first guide surface 57.

Due to the sliding of the pedal shaft 41 along the first guide surface 57, the rear end of the pedal bracket 17 is forcibly pushed backward, and the pedal bracket 17 is bended at its base end fixed to the dashpanel 1.

In this case, since the first guide surface 57 has a gentle inclination, a reaction force applied to the reinforcing member 9 via the first guide member 53 does not increase, which serves in favor of the prevention of breakage of the reinforcing member 9.

After having finished sliding along the first guide surface 57, the pedal shaft 41 abuts against and slides along the downwardly inclined second guide surface 58 of the second guide member 54 as shown in FIG. 13. Since the second guide surface 58 is located at a lower position than the first guide surface 57 and the inclination of the second guide surface 58 is steeper than that of the first guide surface 57, the rear end of the pedal bracket 17 is considerably pushed downward. That is, the pedal bracket 17 is considerably bended downward. As a consequence, the movement of the pedal portion 16 of the brake pedal 15 toward the rear of the automobile body is suppressed.

Further, the pedal shaft 41 abuts against the second guide surface 58 while moving toward the rear of the automobile body. Therefore, the frictional resistance in the initial sliding of the pedal shaft 41 does not increase, and thus the pedal shaft 41 smoothly slides; in addition, it becomes possible to avoid the application of a large collision load on the second guide member 54 and the reinforcing member 9.

Furthermore, even if the first guide member 53 is deformed or broken before the pedal shaft 41 abuts against the second guide surface 58, the second guide member 54 is unlikely to be influenced by the deformation and/or breakage of the first guide member 53 because the second guide member 54 is formed separately from the first guide member 53 and is located at a position different from that of the first guide member 53. That is, the pedal shaft 41 can be abutted against and slid along the second guide surface 58 of the second guide member 54 to change the position of the pedal bracket 17 with certainty.

Accordingly, even if the automobile collides with an obstacle to move the engine 2 backward, a large foot space is ensured for the driver, and thus a large load is prevented from being applied to the foot of the driver stepping on the pedal portion 16.

Alternatively, the pedal shaft 41 may abut against the first guide surface 57 before the fastening of the fastening mechanism 40 is loosened. Even in such a case, the pedal shaft 41 abuts against the first guide surface 57 while the bolts 61 of the fastening mechanism 40 are being disengaged from the slots 25 due to the movement of the pedal bracket 17 toward the rear of the automobile body; therefore, this abutment will not be a serious hindrance to the disengagement. Besides, since the first guide surface 57 has a gentle inclination, the resistance generated when the pedal shaft 41 slides along the first guide surface 57 is low. As a consequence, it becomes possible to avoid the situation in which the disengagement is hindered.

Fifth Embodiment

Figure 14:
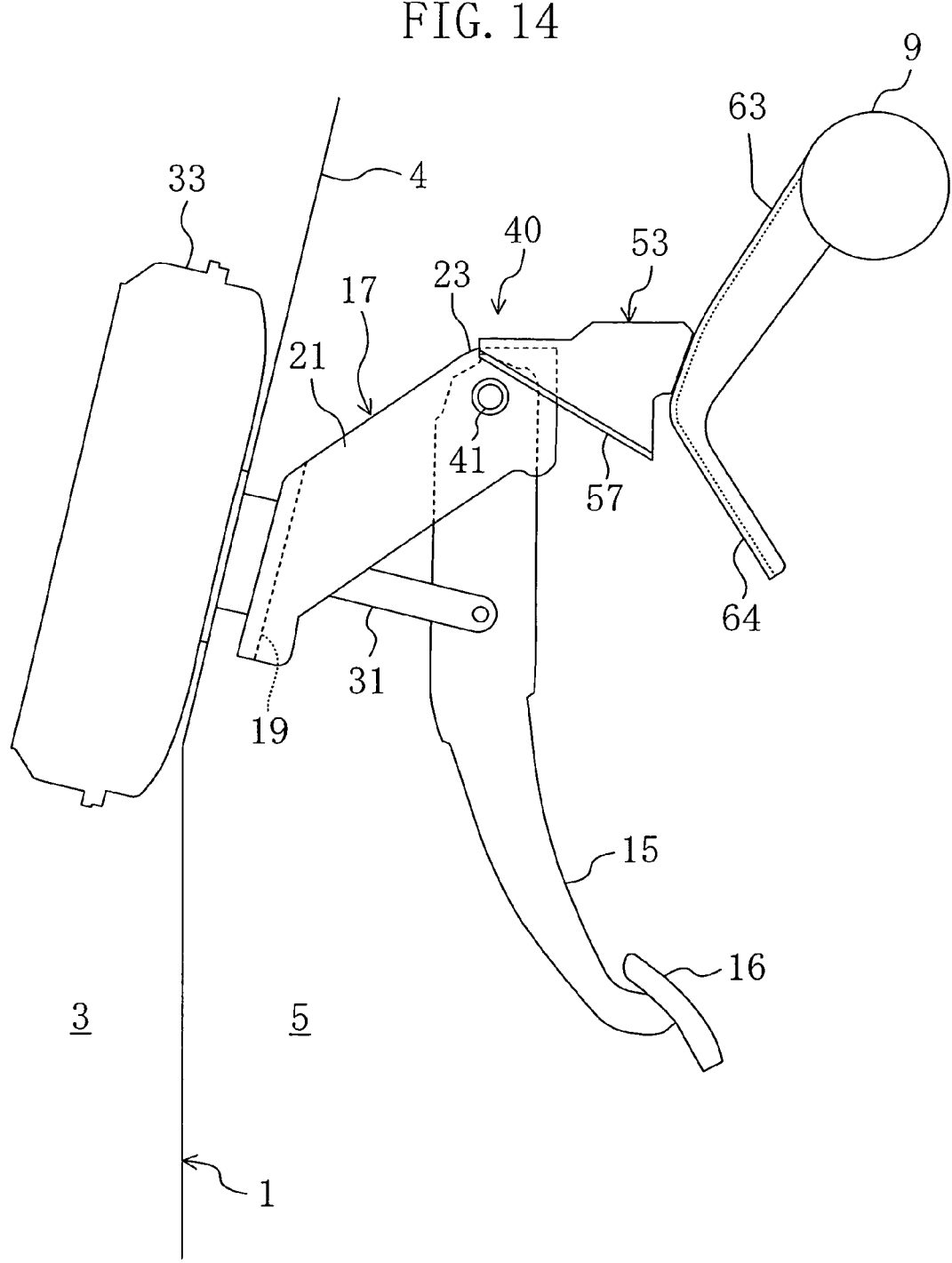
FIG. 14 is a side view illustrating a guide mechanism according to a fifth embodiment of the present invention when automobile collision is not caused.
Figure 15:
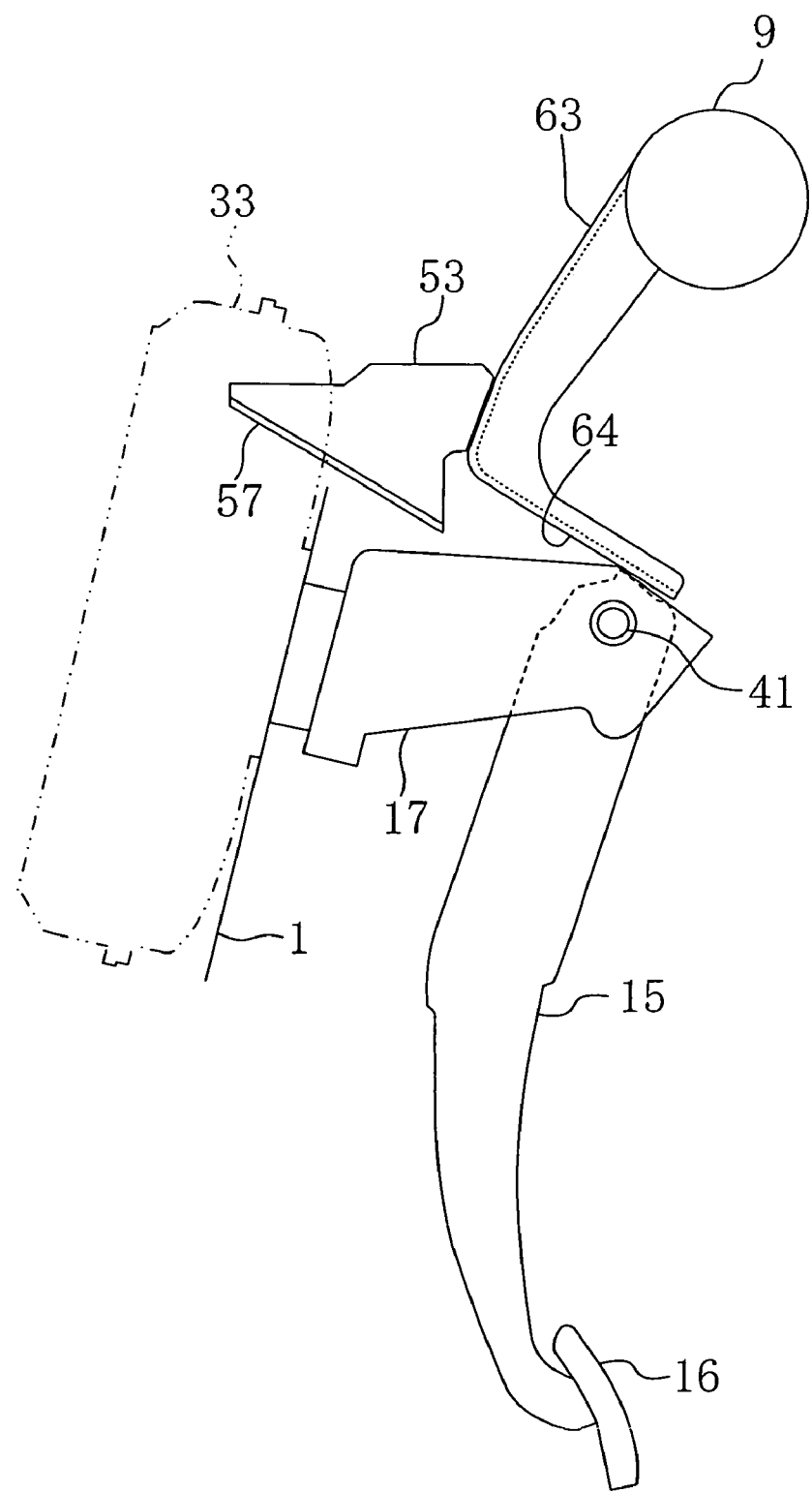
FIG. 15 is a side view illustrating the guide mechanism according to the fifth embodiment when automobile collision is caused.

A fifth embodiment of the present invention is illustrated in FIGS. 14 and 15. It should be noted that in FIGS. 14 and 15, the same components as those in the first embodiment are identified by the same reference characters, and the description thereof will be omitted.

As shown in FIG. 14, a guide bracket 63 extended forward and obliquely downward is fixed to the reinforcing member 9. The guide bracket 63 is formed into a channel shape opened at its rear side, and the first guide member 53 is fixed to a front face of a lower part of the guide bracket 63. A lower end of the guide bracket 63 is extended rearward and obliquely downward, and the lower face of this extended portion is formed as a second guide surface 64. Therefore, in the present embodiment, the guide bracket 63 constitutes the second guide member.

The pedal shaft 41 abuts against and slides along the first guide surface 57 of the first guide member 53 like the first embodiment. On the other hand, since the second guide surface 64 is located at a position corresponding to a channel groove formed in the first guide member 53, the rear end upper portion 23 of the support part 21 of the pedal bracket 17 abuts against and slides along the second guide surface 64.

Although the first and second guide surfaces 57 and 64 are each inclined to become gradually lowered toward the rear of the automobile body, the inclination of the second guide surface 64 is steeper than that of the first guide surface 57. Further, the second guide surface 64 is extended downwardly of the lowermost rear end of the first guide surface 57.

The pedal bracket 17 and the first guide member 53 are detachably fastened together by the fastening mechanism 40 similar to that of the first embodiment.

Therefore, in the fifth embodiment, if the pedal bracket 17 is moved toward the rear of the automobile body due to an automobile collision (in particular, a forward collision), the fastening of the pedal bracket 17 to the first guide member 53 by the fastening mechanism 40 is loosened, and then the pedal shaft 41 abuts against and slides along the first guide surface 57. In this regard, the fifth embodiment is similar to the fourth embodiment, and therefore, the similar effects are achieved.

After the pedal shaft 41 has finished sliding along the first guide surface 57, the rear end upper portion 23 of the pedal bracket 17 then abuts against and slides along the second guide surface 64 as shown in FIG. 15. Since the second guide surface 64 is located below the first guide surface 57, the rear end of the pedal bracket 17 is further pushed downward. As a result, the movement of the pedal portion 16 of the brake pedal 15 toward the rear of the automobile body is suppressed.

Also in the present embodiment, the pedal bracket 17 abuts against the second guide surface 64 while moving toward the rear of the automobile body. Therefore, the frictional resistance in the initial sliding does not increase, and thus the sliding becomes smooth; in addition, it becomes possible to avoid the application of a large collision load on the guide bracket 63, serving as the second guide member, and the reinforcing member 9.

The rear end upper portion (abutment part) 23 of the pedal bracket 17 abuts against the second guide surface 64 after the pedal shaft 41 has finished sliding along the first guide surface 57. Therefore, the pedal shaft 41 and the pedal bracket 17 do not simultaneously abut against the guide surfaces 57 and 64, and the pedal shaft 41 and the pedal bracket 17 do not interfere with each other, thus allowing the pedal shaft 41 and the pedal bracket 17 to smoothly slide.

In the present embodiment, even if the pedal shaft 41 is deformed while it abuts against and slides along the first guide surface 57, the deformation of the pedal shaft 41 does not affect the positional change of the pedal bracket 17 when it slides along the second guide surface 64 because the rear end of the pedal bracket 17 abuts against the second guide surface 64. As a result, the position of the pedal bracket 17 can be changed with certainty.

Accordingly, a large foot space is ensured for the driver, and thus a large load is prevented from being applied to the foot of the driver stepping on the pedal portion 16.

Sixth Embodiment

A sixth embodiment of the present invention is illustrated in FIGS. 16 through 20. It should be noted that in FIGS. 16 through 20, the same components as those in the first embodiment are identified by the same reference characters, and the description thereof will be omitted.

Figure 16:
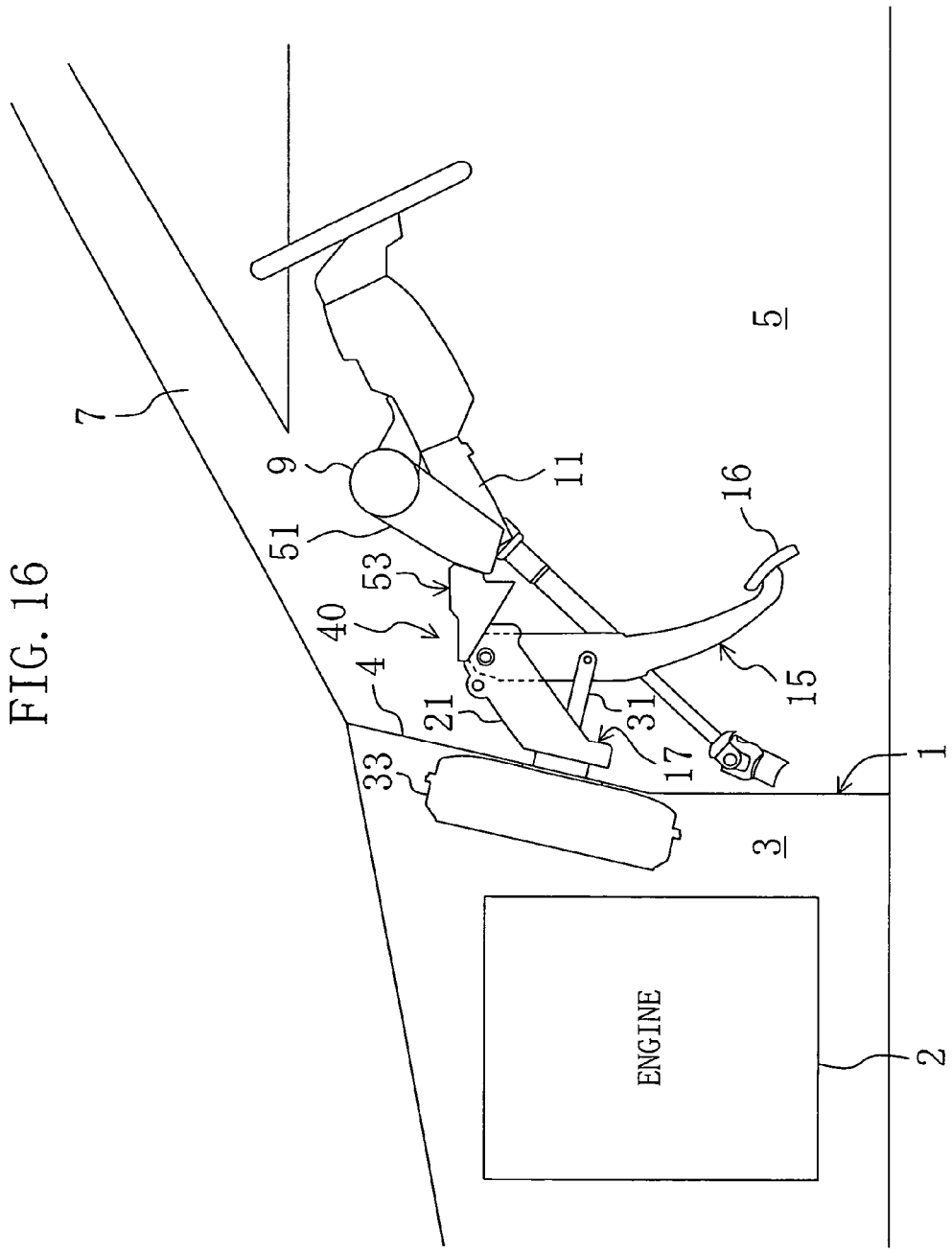
FIG. 16 is a side view illustrating a front section of an automobile body provided with a pedal support structure according to a sixth embodiment of the present invention.

As shown in FIG. 16, the guide bracket 51 extended forward and obliquely downward is fixed to the reinforcing member 9, and the guide member 53 is fixed to the front face of the lower part of the guide bracket 51.

Figure 17:
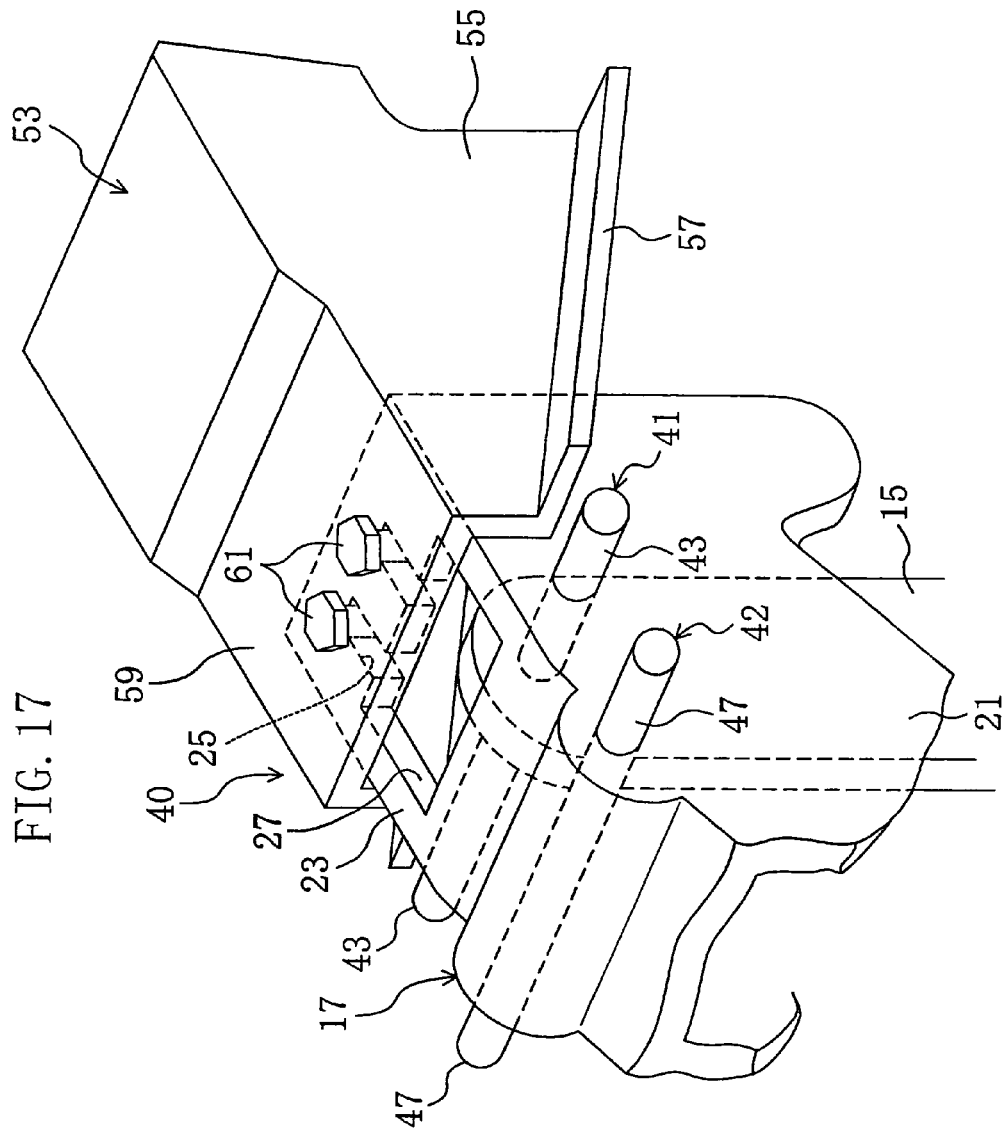
FIG. 17 is an oblique view illustrating a guide mechanism according to the sixth embodiment.

As shown in FIG. 17, the pedal bracket 17 and the guide member 53 are fastened together by the fastening mechanism 40 that allows the detachment of the pedal bracket 17 toward the rear of the automobile body. The fastening mechanism 40 of the sixth embodiment is formed in the same way as that of the first embodiment.

Although the pedal bracket 17 of the sixth embodiment is formed substantially in the same way as that of the first embodiment, the abutment pin 42 is provided at a little higher position than the pedal shaft 41 and located closer to the front of the automobile body than the pedal shaft 41. The pedal shaft 41 of the pedal bracket 17, the abutment pin 42 and the guide member 53 constitute a guide mechanism for changing the position of the pedal bracket 17 so as to suppress the movement of the pedal portion 16 of the brake pedal 15 toward the rear of the automobile body when the pedal bracket 17 is moved toward the rear of the automobile body.

Figure 18:
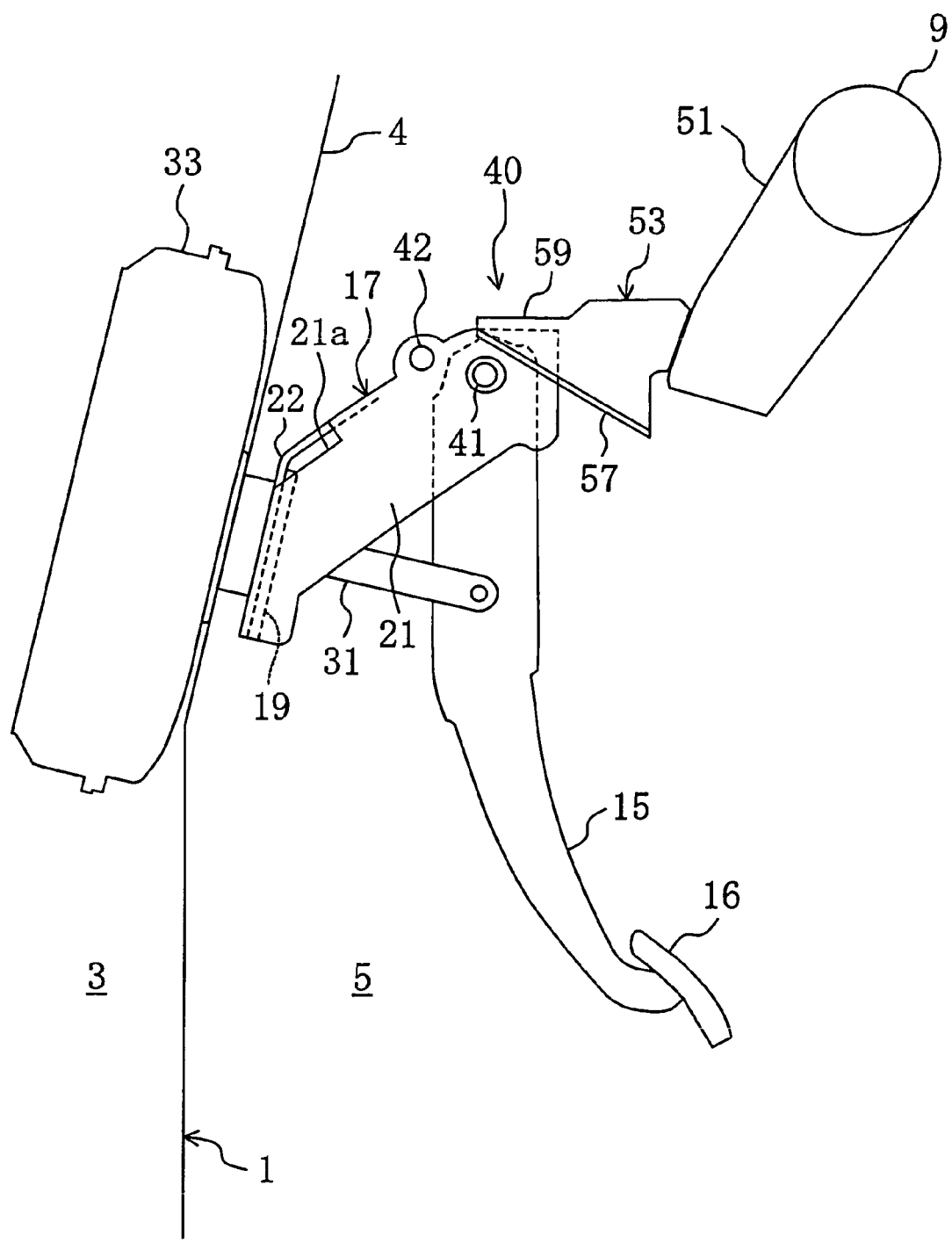
FIG. 18 is a side view illustrating the guide mechanism according to the sixth embodiment when automobile collision is not caused.

The guide member 53 includes, at lower ends of right and left side walls 55 thereof, an outwardly projected flange, and the lower face of this flange is formed as a guide surface 57 on which the protruded portions 43 and 47 of the pedal shaft 41 and the abutment pin 42 abut and slide. As also shown in FIG. 18, the guide surface 57 is inclined to become gradually lowered toward the rear of the automobile body.

Further, the pedal shaft (first abutment part) 41 and the abutment pin (second abutment part) 42 sequentially abut against and slide along the guide surface 57 in accordance with the movement of the pedal bracket 17 toward the rear of the automobile body, thus changing the position of the pedal bracket 17.

Figure 19:
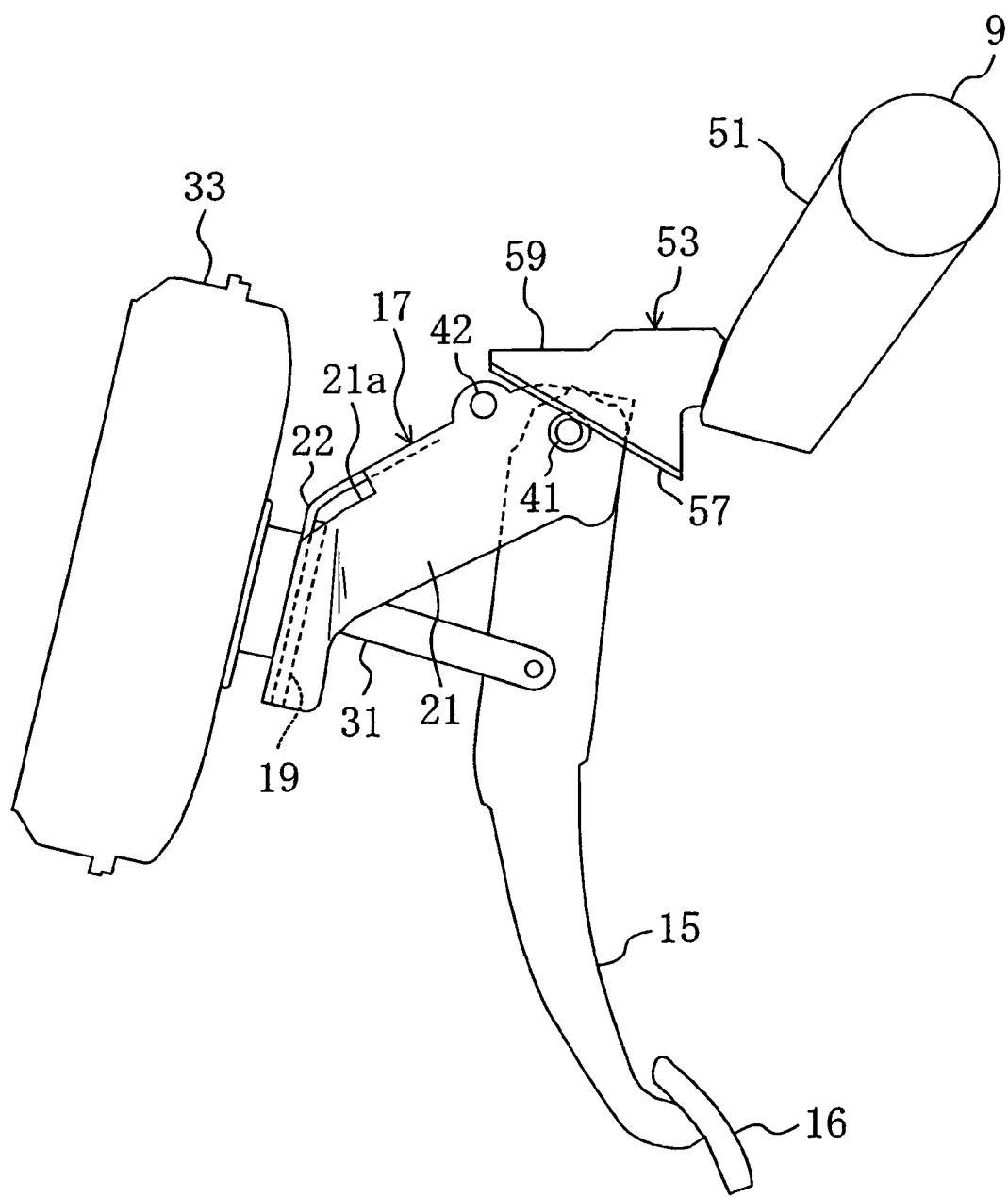
FIG. 19 is a side view illustrating the guide mechanism according to the sixth embodiment when a pedal shaft has abutted against a guide surface.

Therefore, if the pedal bracket 17 is moved toward the rear of the automobile body upon automobile collision and the fastening of the pedal bracket 17 to the guide member 53 by the fastening mechanism 40 is loosened to detach the pedal bracket 17 backward, the pedal shaft 41 provided at the rear part of the pedal bracket 17 abuts against the guide surface 57 of the guide member 53 as shown in FIG. 19. It should be noted that the dashpanel 1 is not shown in FIGS. 19 and 20.

Next, both the ends 43 (protruded portions) of the pedal shaft 41 slide along the guide surface 57 of the guide member 53 while a front part of the pedal bracket 17 is pushed by the dashpanel 1. At this time, the pedal bracket 17 is bended at the bending point 22 that is located at the base end of the pedal bracket 17. Thus, due to the positional relationship between the bending point 22 and the pedal shaft 41 that slides along the guide surface 57, the pedal bracket 17 is slightly bended downward around the bending point 22 (such that the rear part of the pedal bracket 17 is moved downward). Therefore, most of components of a force for pressing the pedal bracket 17 toward the rear of the automobile body are directed in the sliding direction of the pedal shaft 41 along the guide surface 57 of the guide member 53, and thus the pedal shaft 41 smoothly slides along the guide surface 57.

Figure 20:
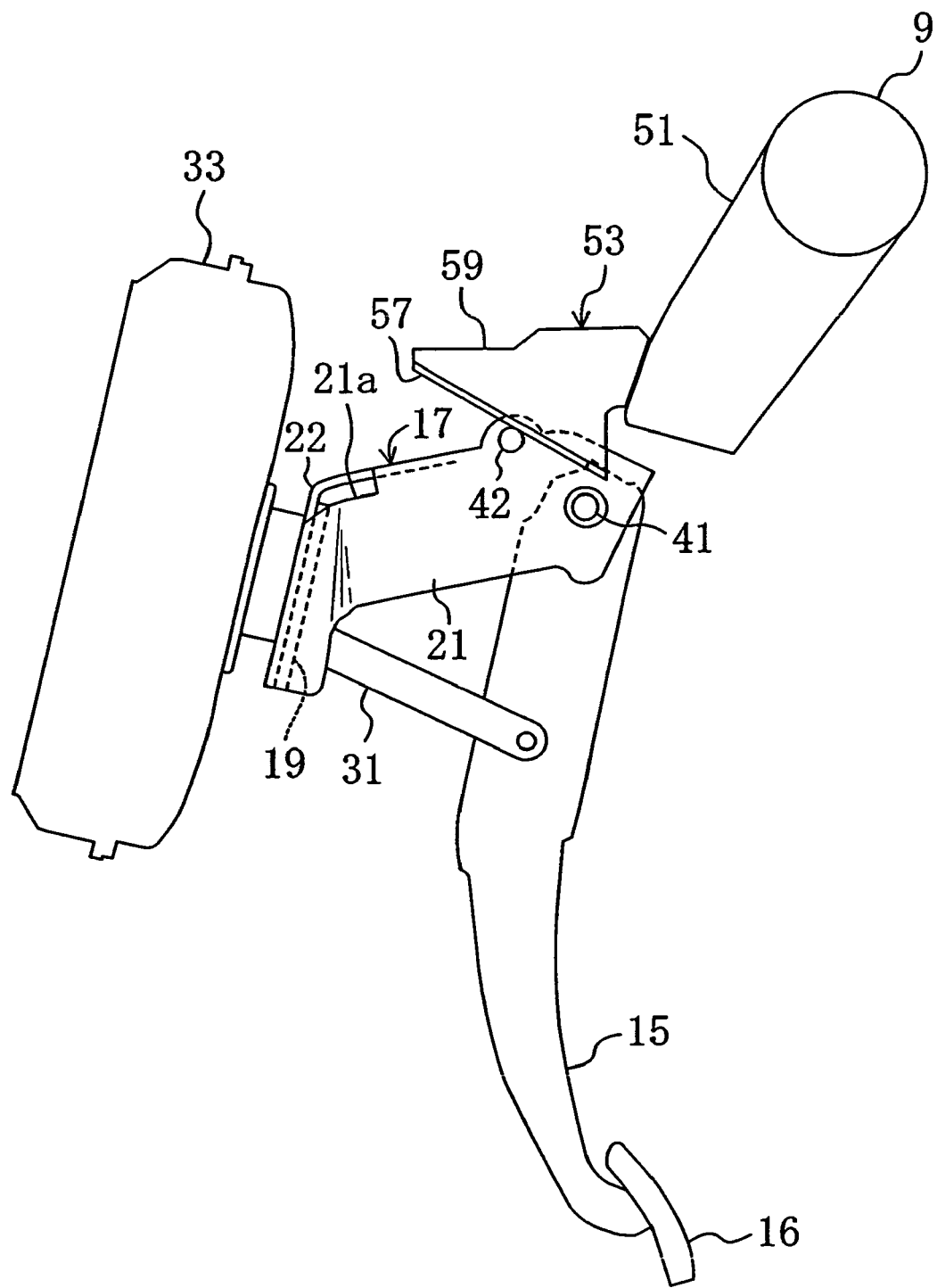
FIG. 20 is a side view illustrating the guide mechanism according to the sixth embodiment when an abutment pin has abutted against the guide surface.

Thereafter, the pedal shaft 41 is detached from the guide surface 57 of the guide member 53, and then the abutment pin 42 abuts against the guide surface 57 as shown in FIG. 20. Thus, the abutment pin 42 abuts against the guide surface 57 after having been accelerated.

The distance between the bending point 22 and the abutment pin 42 when the abutment pin 42 slides along the guide surface 57 of the guide member 53 is shorter than the distance between the bending point 22 and the pedal shaft 41 when the pedal shaft 41 slides along the guide surface 57, and therefore, the pedal bracket 17 is bended further downward around the bending point 22. Thus, the movement of the pedal portion 16 of the brake pedal 15, supported by the pedal bracket 17, toward the rear of the automobile body is suppressed.

Accordingly, also in the present embodiment, the movement of the pedal portion 16 of the brake pedal 15 toward the rear of the automobile body is suppressed with certainty and a large foot space can be maintained below the driver's seat even if the guide member 53 is reduced in size. Furthermore, even if the guide member 53 is reduced in size, the collision load applied to the reinforcing member 9 can be decreased. Since the abutment pin 42 abuts against the guide surface 57 after the pedal shaft 41 has been detached from the guide surface 57, the positional change of the pedal bracket 17 becomes smooth, and the frictional resistance is decreased so as to reduce the load applied to the reinforcing member 9.

The abutment members (i.e., the pedal shaft 41 and the abutment pin 42) are cylindrical pin members, and therefore, they have line contact with the guide surface 57. Thus, as compared with the conventional case where they have surface contact, the frictional resistance between the abutment members and the guide surface 57 can be reduced. This is advantageous in designing layout, and thus not only the positional relationship between the pedal shaft 41 and the abutment pin 42 can be easily adjusted but also the degree of positional change of the pedal bracket 17 can be easily adjusted.

According to the present embodiment, the pedal shaft 41 that supports the brake pedal 15 serves as the first abutment part, which is advantageous from cost-cutting and layout standpoints.

Alternatively, the pedal shaft 41 may be detached from the guide surface 57 after the abutment pin 42 has been abutted against the guide surface 57 of the guide member 53. In that case, the pedal shaft 41 and the abutment pin 42 may simultaneously abut against the guide surface 57 of the guide member 53. Therefore, during the simultaneous abutment, the resulting load can be shared by the pedal shaft 41 and the abutment pin 42, and the load related to the abutment pin 42 can be reduced. Consequently, the weight of the abutment pin 42 can be reduced.

Hereinafter, the effects achieved by providing two abutment parts, and the results obtained by examining the influence of the positional relationship between the two abutment parts on the positional change of the pedal bracket 17 will be described with reference to FIGS. 21 and 23. The following description will be made on the supposition that the dashpanel 1 is displaced backward in a horizontal direction upon automobile collision.

Figure 21:
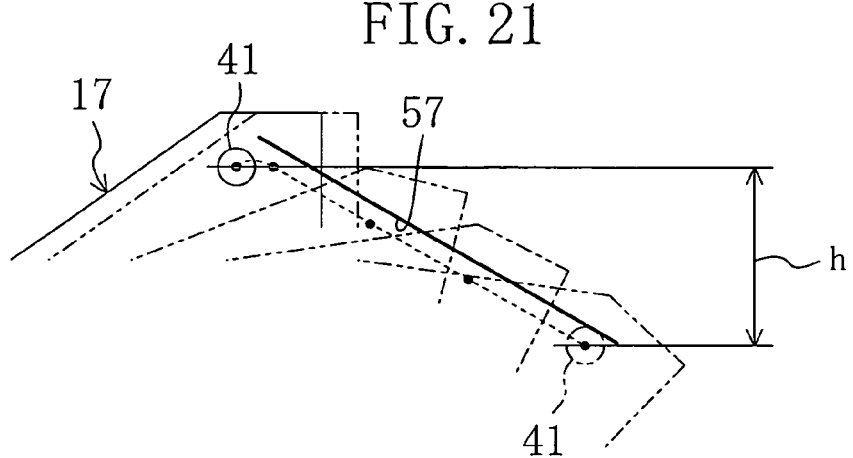
FIG. 21 is a side view illustrating the results obtained by analyzing how a rear part of a pedal bracket is displaced in an automotive pedal support structure according to a comparative example.

FIG. 21 illustrates a comparative example in which the pedal bracket 17 is not provided with the abutment pin 42 but provided with only the pedal shaft 41 (i.e., only one abutment part), and upon automobile collision, the pedal bracket 17 is moved while bending around the bending point 22. The broken lines in FIG. 21 each show the movement of the pedal shaft 41. The broken line in FIG. 21 indicates the movement of the pedal shaft 41. It can be seen from this broken line that the pedal shaft 41 is moved only in parallel with the guide surface 57.

Therefore, in this comparative example, in order to achieve a descent amount h of the pedal shaft 41 required to ensure a large foot space below the driver's seat, the guide surface 57 of the guide member 53 has to be elongated as indicated by the thick line in FIG. 21. However, if the guide surface 57 is elongated in this manner, it becomes difficult to design the layout within the instrument panel.

Figure 22:
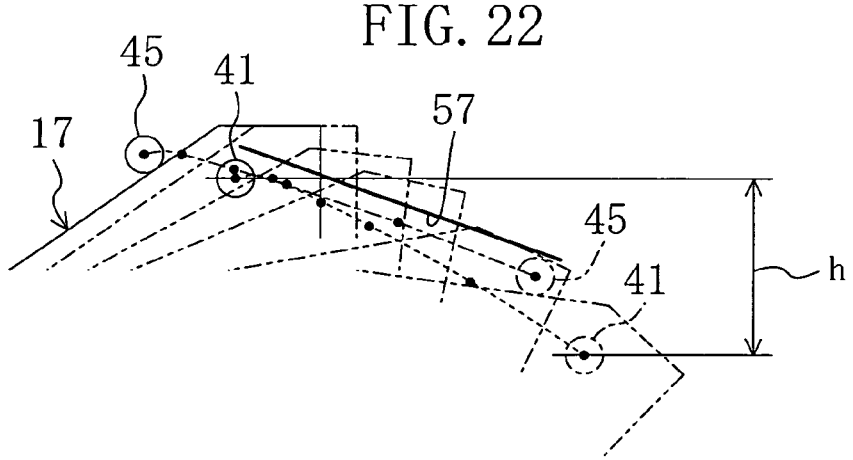
FIG. 22 is a side view partially illustrating the automotive pedal support structure according to the sixth embodiment, which corresponds to FIG. 21.

To the contrary, FIG. 22 illustrates the results obtained by analyzing how the pedal bracket 17 moves in the automotive pedal support structure according to the sixth embodiment. It is found that the length of the guide surface 57, required to move the pedal shaft 41 downward by the same descent amount h as in the comparative example, can be apparently shorter than that of the guide surface 57 in the comparative example.

The pedal bracket 17 is slightly bended downward around the bending point 22 while both the ends 43 of the pedal shaft 41 are sliding along the guide surface 57 of the guide member 53. Then, when the abutment pin 42 abuts against and slides along the guide surface 57 of the guide member 53 as indicated by the alternate long and short dash line in FIG. 22, the pedal shaft 41 goes away from the guide surface 57 as indicated by the broken line in FIG. 22. It is found that since the pedal bracket 17 is bended further downward around the bending point 22 located adjacent to the dashpanel 1, the further downward movement of the pedal shaft 41 can be achieved in this case.

Figure 23:
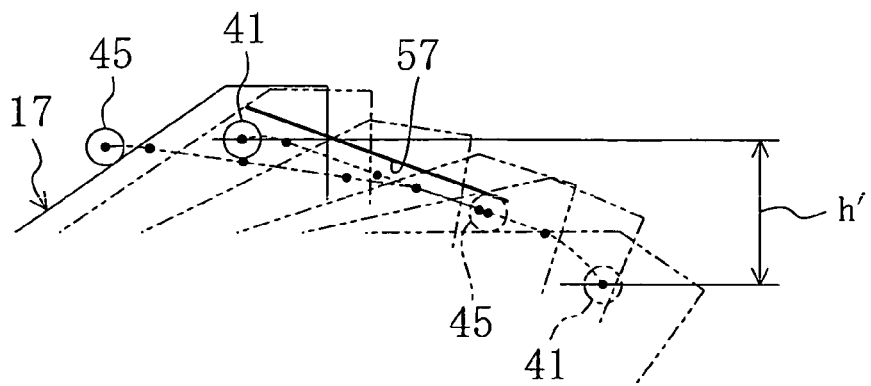
FIG. 23 is a side view partially illustrating an automotive pedal support structure according to a modified example of the sixth embodiment, which corresponds to FIG. 21.

FIG. 23 illustrates the results obtained by analyzing how the pedal bracket 17 moves in the case where the position of the abutment pin 42 is located in front of and slightly below that of the abutment pin 42 in FIG. 22. A descent amount h' of the pedal shaft 41 at the time when the rear end of the pedal bracket 17 has reached the position corresponding to that in FIG. 22 is smaller than the descent amount h in the sixth embodiment. That is, it is found that the more the abutment pin 42 is separated forward from the pedal shaft 41, the more the timing of an increase in degree of bending of the pedal bracket 17 around the bending point 22 is delayed, resulting in a reduction in the descent amount h'. It is also found that if the abutment pin 42 is located below the pedal shaft 41, the degree of bending of the pedal bracket 17 is decreased, resulting in a reduction in the descent amount h'.

In other words, it is found that the descent amount h can be increased if the abutment pin 42 is located in front of and adjacent to the pedal shaft 41. However, in order to prevent an excessive load from being applied to the reinforcing member 9 upon automobile collision, the position of the abutment pin 42 needs to be set so that most of the force for pressing the pedal bracket 17 toward the rear of the automobile body upon collision can be directed in the direction in which the abutment pin 42 moves along the guide surface 57 of the guide member 53. Besides, the abutment pin 42 has to be provided at a higher level than the pedal shaft 41. However, the level of the abutment pin 42 must be set so as to avoid the situation in which the abutment pin 42 gets snagged on a front end upper portion 59 of the guide member 53 and is prevented from abutting against the guide surface 57.

Consequently, it is found that the degree of positional change of the pedal bracket 17 can be easily controlled by appropriately adjusting the positional relationship between the pedal shaft 41 and the abutment pin 42 in this manner.

Other Embodiments

In each of the foregoing embodiments, the abutment part (e.g., the pedal shaft 41) abuts against the guide surface after the fastening of the pedal bracket to the guide member by the fastening mechanism has been loosened. Alternatively, the abutment part may abut against the guide surface before the fastening of the fastening mechanism is loosened. Even in such a case, the abutment part abuts against the guide surface while the bolts 61 of the fastening mechanism are being disengaged from the slots 25 due to the movement of the pedal bracket toward the rear of the automobile body; therefore, this abutment will not be a serious hindrance to the disengagement. In particular, if this guide surface has a gentle inclination, the resistance generated when the abutment part slides along the guide surface is low. Therefore, it becomes possible to avoid the situation in which the disengagement is hindered.

In the case where a plurality of abutment parts sequentially slide along a plurality of guide surfaces associated thereto (the first through third embodiments), the first abutment part may be abutted against (or in contact with) the first guide surface when automobile collision is not caused.

In the case where a single abutment part is sequentially slid along a plurality of guide surfaces (the fourth and fifth embodiments), this abutment part may be abutted against (or in contact with) the first guide surface when automobile collision is not caused.

In the case where a plurality of abutment parts are sequentially slid along a single guide surface (the sixth embodiment), the first abutment part may be abutted against (or in contact with) this guide surface when automobile collision is not caused.

In each of the foregoing embodiments, the rear end upper portion of the pedal bracket is detachably connected to the guide member that is fixed to the reinforcing member. Alternatively, the rear end upper portion of the pedal bracket may be detachably connected to a cowl member side.

Although the pedal shaft is formed as a pin-like abutment part in each of the foregoing embodiments, the pedal bracket 17 may be provided with another pin-like abutment part.

Each of the pin-like abutment parts such as the pedal shaft and the abutment pin does not have to be a solid body, but may be a hollow cylindrical body.

The abutment parts are not limited to pin-like ones, but plate-like abutment parts may alternatively be applied in the present invention.

Each guide surface is formed as a flat inclined surface in each of the foregoing embodiments. Alternatively, each guide surface may be formed as a curved surface.

Although each of the foregoing embodiments has been described on the supposition that the operating pedal is the brake pedal 15, the present invention may be applied to the other operating pedal support structures disposed behind automotive dashpanels. For example, the present invention is applicable to a clutch pedal or a parking brake pedal.

What is claimed is:

1. An automotive pedal support structure comprising:
a pedal bracket fixed to a dashpanel of an automobile;
an operating pedal supported to the pedal bracket so as to swing forward and backward;
a reinforcing member extended in a widthwise direction of the automobile; and
a guide mechanism for changing the position of the pedal bracket to suppress a relative movement of a pedal portion of the operating pedal toward the rear of the automobile when the pedal bracket is moved relatively toward the rear of the automobile,
wherein the guide mechanism comprises: a first guide member including a first guide surface that is supported to the reinforcing member, and is inclined obliquely downward to become gradually lowered toward the rear of the automobile; a second guide member including a second guide surface that is supported to the reinforcing member, and is inclined obliquely downward to become gradually lowered toward the rear of the automobile; a first abutment part that is provided at the pedal bracket to abut against and slide along the first guide surface with the relative movement of the pedal bracket toward the rear of the automobile; and a second abutment part that is provided at the pedal bracket to abut against and slide along the second guide surface with the relative movement of the pedal bracket toward the rear of the automobile, and
wherein the first and the second guide members are arranged so that the first and second guide surfaces are located apart from each other in a vertical direction, and the first and second abutment parts are arranged apart from each other in a longitudinal direction of the automobile;
the first abutment part is formed by a hollow or solid cylindrical support shaft through which the operating pedal is supported to the pedal bracket and which extends in a widthwise direction of the automobile; and
the second abutment part is formed by a hollow or solid cylindrical pin member provided at the pedal bracket to extend in a widthwise direction of the automobile.

2. The automotive pedal support structure of claim 1, wherein the first and second guide surfaces are located to overlap with each other in plan view.

3. The automotive pedal support structure of claim 1, wherein a front end of the pedal bracket fixed to the dashpanel is formed with a point from which the pedal bracket bends when a downward force acts thereon; and the length from the bending point to the second abutment part is shorter than the length from the bending point to the first abutment part.

4. The automotive pedal support structure of claim 1, wherein the first and second guide members are arranged so that the first guide surface is located above the second guide surface, and the second abutment part is arranged at a more forward position than the first abutment part so that the first abutment part abuts against and slides along the first guide surface at an upper side of the second guide member with the relative movement of the pedal bracket toward the rear of the automobile, and then, the second abutment part abuts against and slides along the second guide surface.

5. The automotive pedal support structure of claim 1,
wherein the first and second guide members are arranged so that the first guide surface is located above the second guide surface, and the first abutment part is arranged at a more backward position of the automobile than the second abutment part so that the second abutment part abuts against the second guide surface after the first abutment part has finished sliding along the first guide surface.

* * * * *